(12) United States Patent
Adams et al.

(10) Patent No.: US 6,380,978 B1
(45) Date of Patent: Apr. 30, 2002

(54) DIGITAL VIDEO SYSTEM AND METHODS FOR PROVIDING SAME

(75) Inventors: Dale R. Adams, San Jose; Laurence A. Thompson, Saratoga; Jano D. Banks, Cupertino; David C. Buuck, Santa Clara; Cheng Hwee Chee, Saratoga, all of CA (US)

(73) Assignee: DVDO, Inc., Campbell, CA (US)

( * ) Notice: Subject to any disclaimer, the term of this patent is extended or adjusted under 35 U.S.C. 154(b) by 0 days.

(21) Appl. No.: 09/167,527

(22) Filed: Oct. 6, 1998

Related U.S. Application Data

(63) Continuation-in-part of application No. 09/166,606, filed on Oct. 5, 1998.
(60) Provisional application No. 60/102,946, filed on Oct. 2, 1998, provisional application No. 60/100,401, filed on Sep. 15, 1998, provisional application No. 60/096,144, filed on Aug. 11, 1998, provisional application No. 60/095,164, filed on Aug. 3, 1998, provisional application No. 60/094,390, filed on Jul. 28, 1998, provisional application No. 60/093,815, filed on Jul. 23, 1998, and provisional application No. 60/060,974, filed on Oct. 6, 1997.

(51) Int. Cl.[7] .......................... H04N 7/01; H04N 11/20
(52) U.S. Cl. ...................................... 348/452; 348/448
(58) Field of Search ................................ 348/450, 452, 348/448, 699–701, 604, 572, 625; 343/132, 133, 154, 474, 475, 302, 523; H04N 7/01, 11/20

(56) References Cited

U.S. PATENT DOCUMENTS

| | | | |
|---|---|---|---|
| 4,731,660 A | 3/1988 | Faroudja et al. | 358/31 |
| 4,790,028 A | 12/1988 | Ramage | 382/47 |
| 4,876,596 A | 10/1989 | Faroudja | 358/140 |
| 4,881,125 A | 11/1989 | Krause | 358/141 |
| 4,937,667 A | 6/1990 | Choquet et al. | 358/140 |
| 4,989,090 A | 1/1991 | Campbell et al. | 358/140 |
| 4,998,287 A | 3/1991 | Katznelson et al. | 382/34 |
| 5,014,119 A | 5/1991 | Faroudja et al. | 358/37 |
| 5,291,280 A | 3/1994 | Faroudja et al. | 348/416 |
| 5,299,029 A | 3/1994 | Moriya et al. | 358/447 |
| 5,347,314 A | * 9/1994 | Faroudja et al. | 348/448 |
| 5,428,398 A | 6/1995 | Faroudja | 348/452 |
| 5,469,216 A | 11/1995 | Takahashi et al. | 348/441 |
| 5,471,577 A | 11/1995 | Lightbody et al. | 395/157 |
| 5,473,383 A | 12/1995 | Sezan et al. | 348/452 |
| 5,488,422 A | 1/1996 | Faroudja et al. | 348/448 |
| D371,357 S | 7/1996 | Nakamura | D14/136 |

(List continued on next page.)

OTHER PUBLICATIONS

Micron Technology Inc., Technical Note, Achieve Maximum Compatibility In SDRAM/SGRAM Design, Compatibility in SDRAM/SGRAM Design, May, 1997.

Micron Technology Inc., Synchronous DRAM, 16 MEG: x16 SDRAM, Oct., 1997.

*Primary Examiner*—Michael Lee
(74) *Attorney, Agent, or Firm*—Oppen heimer Wolff & Donnelly LLP

(57) ABSTRACT

A digital image enhancer includes a deinterlacing processor receptive to an interlaced video stream. The deinterlacing processor includes a first deinterlacer and a second deinterlacer and provides a deinterlaced video stream. The digital image enhancer also includes a video output processor receptive to the output of the deinterlaced video stream to provide a scaled, deinterlaced video stream. A portable DVD player including the digital video enhancer has a generally thin prismatic enclosure having a first major surface, a second major surface separated from said first major surface, and side surfaces connecting the first major surface to the second major surface. At least a portion of the first major surface includes a video display, and the enclosure includes a DVD entry port such that a DVD can be inserted into the enclosure.

16 Claims, 40 Drawing Sheets

U.S. PATENT DOCUMENTS

| | | | |
|---|---|---|---|
| 5,532,750 A | 7/1996 | DeHaan et al. | 348/452 |
| 5,532,751 A | 7/1996 | Lui | 348/452 |
| 5,563,651 A | 10/1996 | Christopher et al. | 348/97 |
| 5,602,654 A | 2/1997 | Patti et al. | 358/461 |
| 5,619,272 A | 4/1997 | Salmon et al. | 348/452 |
| 5,621,470 A | 4/1997 | Sid-Ahmed | 348/448 |
| 5,625,421 A | 4/1997 | Faroudja et al. | 348/607 |
| 5,661,525 A | 8/1997 | Kovacevicet al. | 348/452 |
| 5,689,301 A | 11/1997 | Christopher et al. | 348/97 |
| 5,706,451 A | 1/1998 | Lightbody et al. | 395/327 |
| 5,748,250 A | 5/1998 | Markandey et al. | 348/451 |
| 5,754,248 A | 5/1998 | Faroudja | 348/474 |
| 5,771,331 A | 6/1998 | Aoki et al. | 386/68 |
| 5,963,261 A * | 10/1999 | Dean | 348/448 |
| 6,034,733 A * | 3/2000 | Balram et al. | 348/448 |

\* cited by examiner

| set(1) | c(1), c(9), c(17), c(25), c(33), c(41) |
|---|---|
| set(2) | c(2), c(10), c(18), c(26), c(34), c(42) |
| set(3) | c(3), c(11), c(19), c(27), c(35), c(43) |
| set(4) | c(4), c(12), c(20), c(28), c(36), c(44) |
| set(5) | c(5), c(13), c(21), c(29), c(37), c(45) |
| set(6) | c(6), c(14), c(22), c(30), c(38), c(46) |
| set(7) | c(7), c(15), c(23), c(31), c(39), c(47) |
| set(8) | c(8), c(16), c(24), c(32), c(40), c(48) |

DIGITAL VIDEO SYSTEM AND METHODS FOR PROVIDING SAME

CROSS REFERENCE TO RELATED APPLICATIONS

This application claims the benefits of co-pending U.S. Provisional Patent Application No. 60/060,974 filed on Oct. 6, 1997, U.S. Patent Provisional Application No. 60/096,144 filed on Aug. 11, 1998, U.S. Patent Provisional Application No. 60/102,946 filed on Oct. 2, 1998, U.S. Patent Provisional Application No. 60/100,401 filed on Sep. 15, 1998, U.S. Patent Provisional Application No. 60/094,390 filed on Jul. 28, 1998, U.S. Patent Provisional Application No. 60/093,815 filed on Jul. 23, 1998, U.S. Patent Provisional Application No. 06/095,164 filed on Aug. 3, 1998, and is a continuation in part of U.S. Patent Application No. 09/166,606 filed on Oct. 5, 1998, which are incorporated herein by reference.

BACKGROUND OF THE INVENTION

1. Field of the Invention

The present invention relates generally to portable video player technology and the processing of video images and, more particularly, to techniques for deinterlacing and enhancing video images.

2. Description of the Related Art

There has been a rapid evolution from analog video technology to digital video technology because of the advantages that digital video has to offer. Digital video can be stored and distributed more cheaply than analog video because digital video can be stored on randomly accessible media such as magnetic disc drives (hard disks) and optical disc media known as compact discs (CDs). Once stored on a randomly accessible media, digital video may become interactive, allowing it to be used in games, catalogs, training, education, and other applications.

One of the newest products to be based on digital video technology is the digital video disc, sometimes called "digital versatile disc" or simply "DVD." These discs are the size of an audio CD, yet hold up to 17 billion bytes of data, 26 times the data on an audio CD. DVD storage capacity (17 Gbyte) is much higher than CD-ROM (600 Mbyte) and a DVD can deliver the data at a higher rate than CD-ROM. Therefore, DVD technology represents a tremendous improvement in video and audio quality over traditional systems such as televisions, VCRs and CD-ROM.

However, a major problem in utilizing DVD and other digital video technology to display motion pictures is that is that the sources of motion pictures come at different frame speeds. For example, standard film is shot at a rate of 24 Hz while a television broadcast using the National Television System Committee (NTSC) standard updates motion at 60 Hz. Converting the motion picture into digital video through a process called deinterlacing often produces a noticeable reduction in resolution as well as distortions known as motion artifacts.

Another problem with utilizing digital video technology is that motion pictures come in various formats. For example, movies in the theater are formatted for a wide screen while video displays are often much narrower. Video image scaling converts a digital or digitized image from one format to another. For example, a digital image with a spatial resolution of 720 horizontal by 480 vertical pixels may have to be converted to another resolution in order to be displayed on a particular display device such as a LCD panel with a fixed resolution of 640×480. However, most prior art video scaling methods provide poor resolution in the converted image. The scaling methods that provide quality resolution are extremely expensive to implement.

Yet another problem with video image scaling is that it may require the transfer of data between two asynchronous and/or different data rate domains. Using the example in the above paragraph, scaling from 720 horizontal pixels to 640 pixels (9:8 ratio) requires an interface between a 54 Mhz domain and a 48 Mhz domain (9:8 ratio). In the prior art, the transferring of data between two asynchronous and/or different data rate domains used large, expensive buffers.

Another reason that digital video technology has been difficult to utilize is because DVD players are typically large, cumbersome devices that are difficult to transport. Because DVD players must be operationally attached to a video display, such as a television or television monitor, they are virtually impossible to use anywhere space is limited. Furthermore, prior art mobile video systems suffer from a large number of annoying problems. Hand-held and mobile television sets typically exhibit reception maladies such as RF multipath interference and poor or erratic signal strength in rural areas. Integrated TV/VCR combo units can counter these problems by providing tape playback capability, but they tend to be physically large and not truly portable.

In view of the foregoing, it is desirable to have a portable video player capable of being easily transported and being used under a wide variety of conditions. It is further desirable to have a method and apparatus of deinterlacing and reformatting that provides for preservation of the full resolution of an image, while at the same time eliminating motion artifacts. It is further desirable to have a method and apparatus for providing high quality video scaling and vertical processing while minimizing cost. It is desirable to have a method and apparatus that provides for an asynchronous data interface while minimizing cost and eliminating the need for large and expensive buffers.

SUMMARY OF THE INVENTION

It should be appreciated that the present invention can be implemented in numerous ways, including as a process, an apparatus, a system, a device or a method. Several inventive embodiments of the present invention are described below.

In one embodiment of the present invention, a digital image enhancer is disclosed. The digital image enhancer includes a deinterlacing processor receptive to an interlaced video stream. The deinterlacing processor includes a first deinterlacer and a second deinterlacer and provides a deinterlaced video stream. The digital image enhancer also includes a video output processor receptive to the output of the deinterlaced video stream to provide a scaled, deinterlaced video stream.

In another embodiment of the present invention, a digital image enhancer is disclosed including a deinterlacing processor receptive to an interlaced video stream and operative to provide a deinterlaced video stream. The digital image enhancer also includes a video output processor receptive to the output of the deinterlacing processor. The deinterlacing processor processes the interlaced video stream in vertical slices to provide a scaled, deinterlaced video stream.

In yet another embodiment of the present invention, a portable DVD player is disclosed. The portable DVD player includes a generally thin prismatic enclosure having a first major surface, a second major surface separated from said first major surface, and side surfaces connecting the first major surface to the second major surface. At least a portion of the first major surface includes a video display, and the enclosure includes a DVD entry port such that a DVD can be inserted into the enclosure.

The portable DVD player also includes a digital processing system including a decoder, an image enhancement engine, and a display controller. The decoder receives signals from a DVD inserted into the enclosure to provide a decoded, interlaced video signal. The image enhancement engine converts the interlaced video signal to a deinterlaced video signal. The display controller uses the deinterlaced video signal to provide progressively scanned video on said video display.

In yet another embodiment of the present invention, a method for processing digital video is disclosed. The method includes deinterlacing an interlaced video stream by at least one of a number of deinterlacing methods to produce a deinterlaced video stream. The method also includes scaling the deinterlaced video stream.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings. To facilitate this description, like reference numerals designate like structural elements.

DETAILED DESCRIPTION OF THE PREFERRED EMBODIMENTS

In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

Figure 1A:
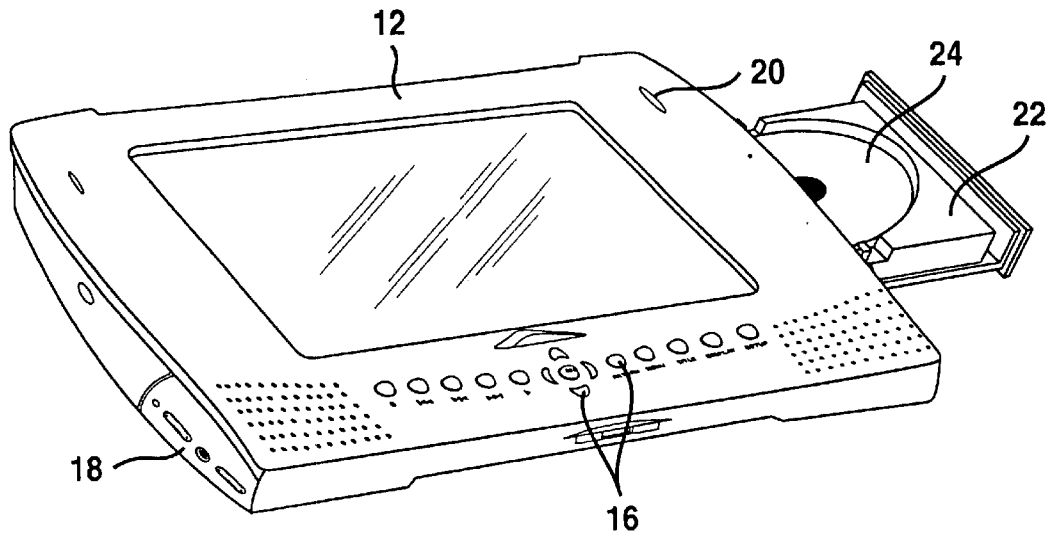
FIGS. 1A and 1B illustrate a portable DVD player in accordance with one embodiment of the present invention.
Figure 1B:
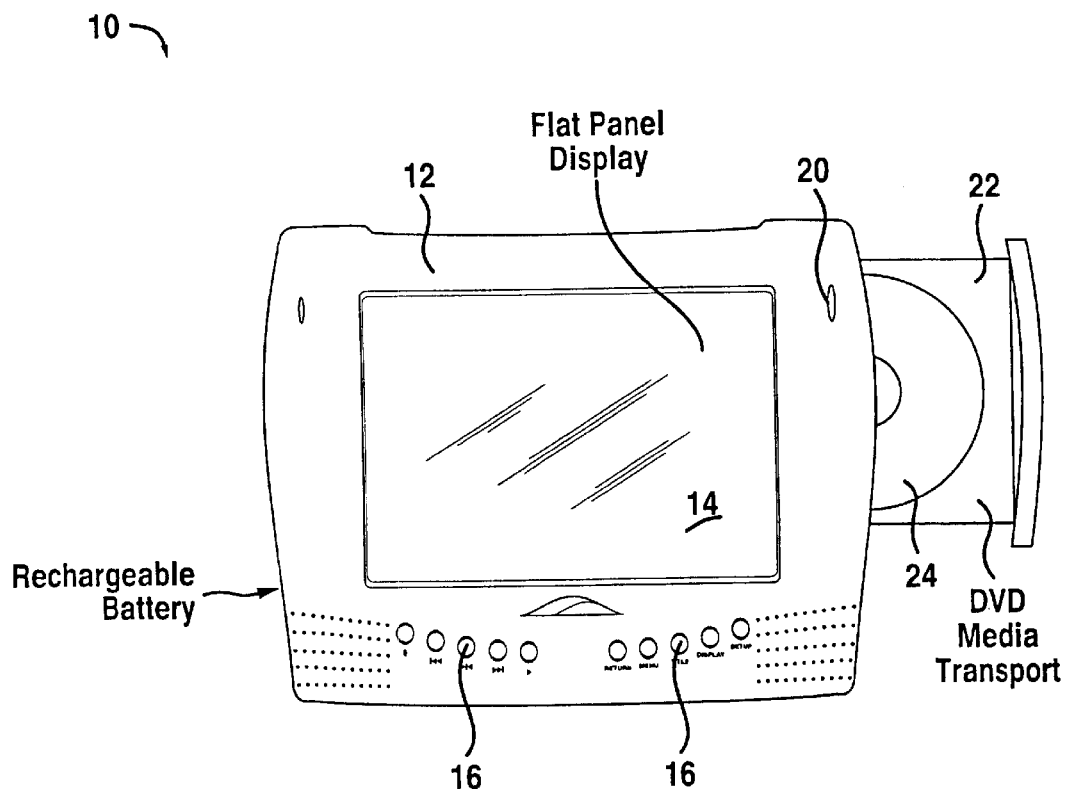

FIGS. 1A and 1B illustrate a portable DVD player 10 in accordance with one embodiment of the present invention. The DVD player 10 includes a housing 12 that serves as an enclosure or chassis for the components of the DVD player 10. A screen 14 for viewing the video and control buttons 16 to control the DVD player 10 are located on the top face of the housing 12. Power and signal interfaces 18 are located on one of the two side faces of the housing 12, while an infrared (IR) interface 20 and a media transport 22 are located on the other side face. A DVD 24 can fit within a suitably configured recess in the media transport 22, and the media transport 22 withdraws into the housing 12 to permit the playback of DVD 24.

Figure 2A:
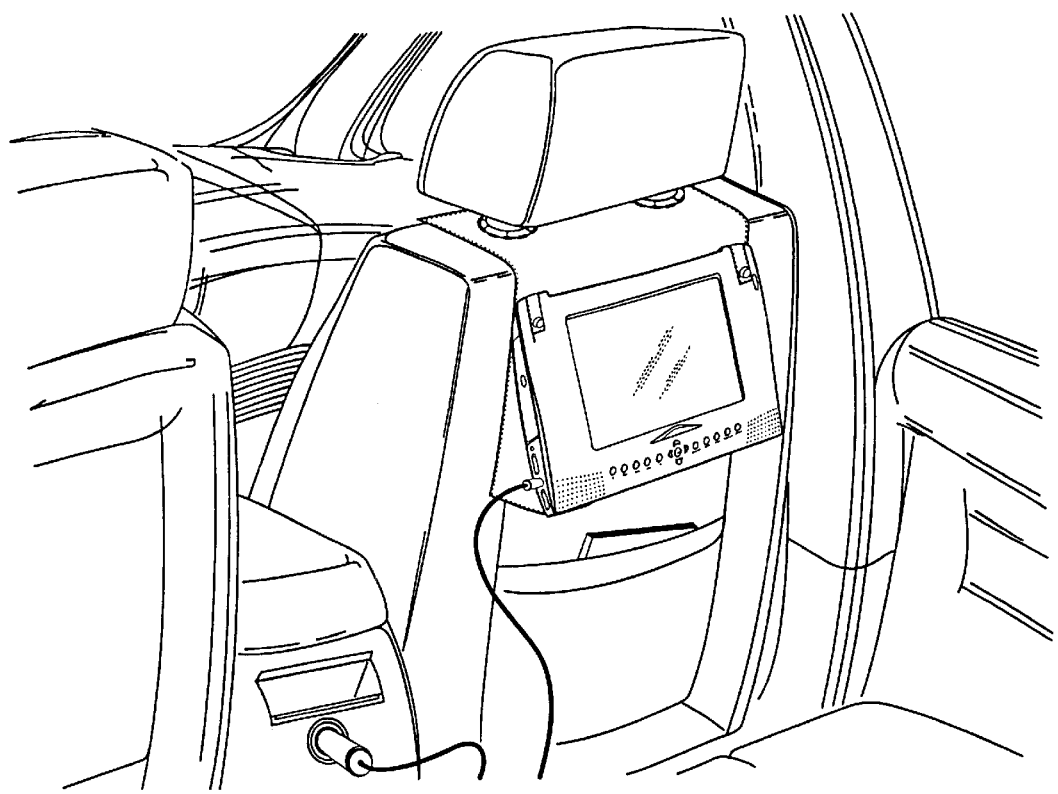
FIGS. 2A, 2B, and 2C illustrate several different applications for the DVD player in accordance with one embodiment of the present invention.
Figure 2B:
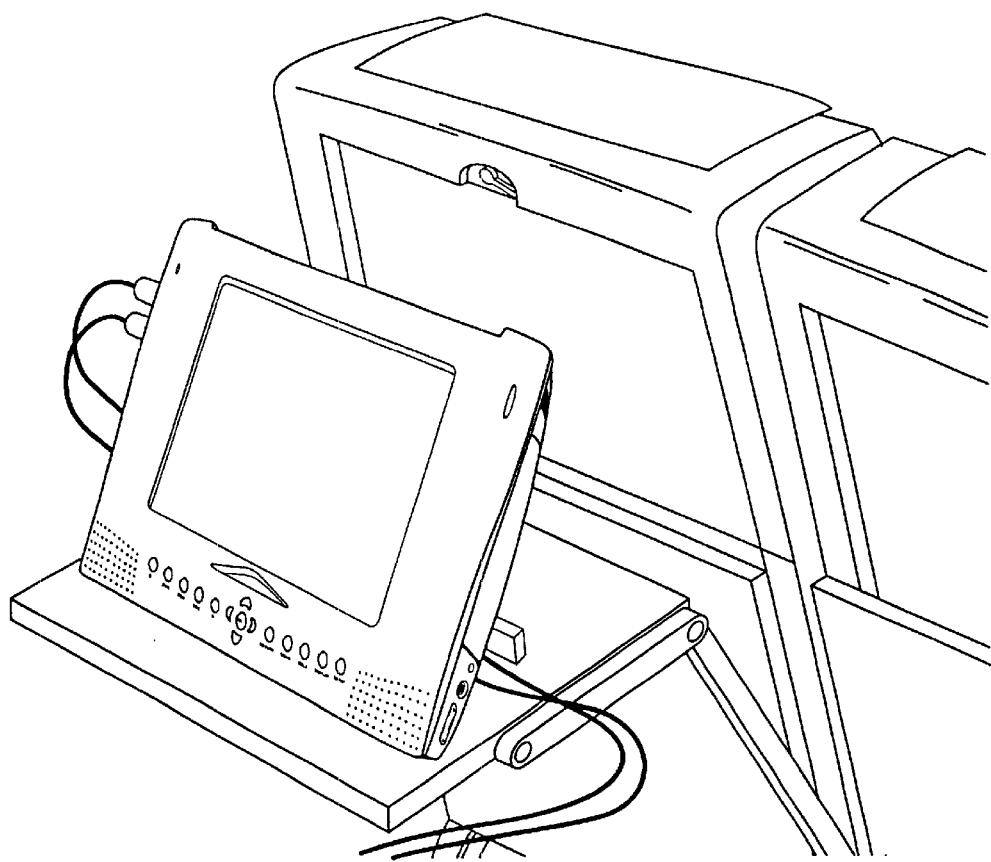
Figure 2C:

FIG. 2A shows an illustration of use in an automobile, but the idea can be extended to most types of transportation. The present invention is ideally suited to the traveler who spends long hours in a passive commute, such as on an airplane, train, or subway as illustrated in FIG. 2B. In addition, many commercial applications are possible as well, for example, video advertising in taxicabs or other settings where a captive audience exists. The present invention can also be placed on the magazine rack of every Stairmaster® exercise machine and treadmill in a fitness center setting, as illustrated in FIG. 2C.

Wherever portable video playback is needed, the present invention can be there. Anywhere great sound, DVD and CD playback, or TV viewing is desired, the present invention will be the ideal mobile solution. Great examples of the versatility of the present invention uses are: air travel entertainment, movies, videos, personal education and study (each disc is capable of storing thousands of books), and on-the-spot do-it-yourself videos in topics such as auto repair, gardening, cooking, home projects.

Furthermore, the present invention can be used as a portable video display device for video games, camcorder playback, or digital still camera image viewing, and for OEM applications such as video kiosks, commercial airliners and fitness centers. The portable DVD player 10 can also be used to present sales content: bus, elevator, taxicab, real estate walk through videos, etc. It can even be utilized as a hang-it-on-the-wall flat television or display device—fine art discs, "dynamic art", etc.

Figure 2D:
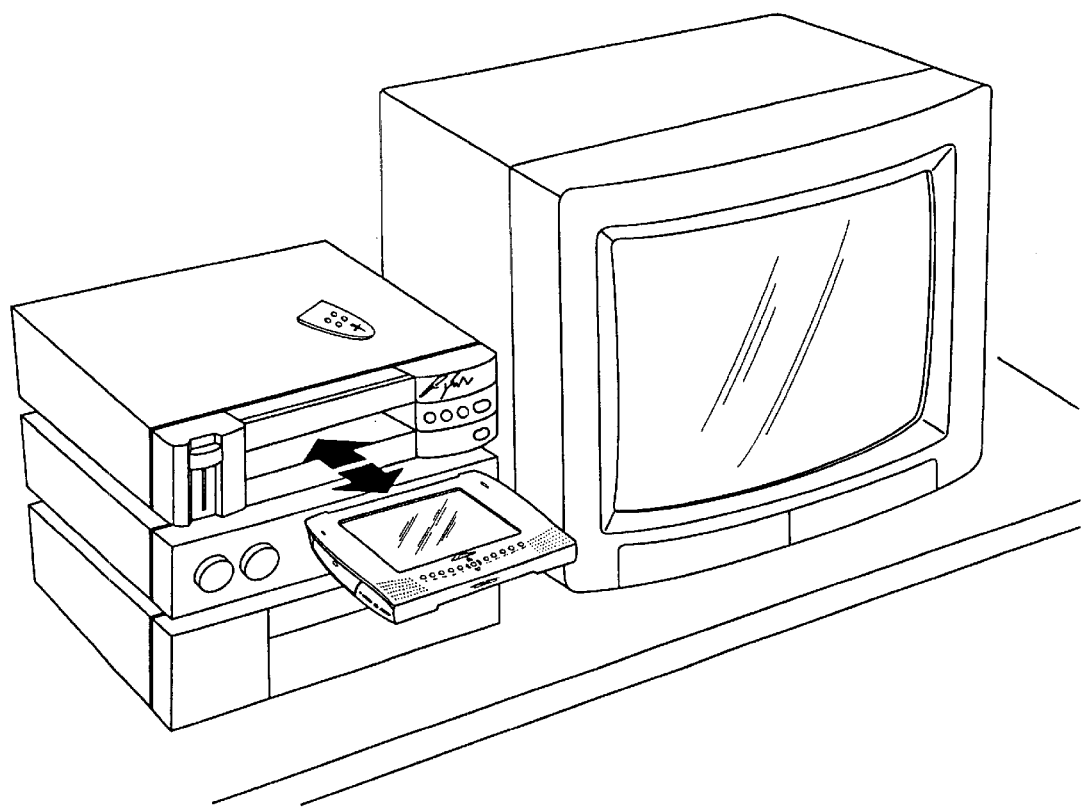
FIG. 2D illustrates a docking station and associated video monitor for the DVD player in accordance with one embodiment of the present invention.

FIG. 2D illustrates a "Home Theater Docking Station" provides an uncomplicated, one-step connection and operation capability for when the present invention is used as a simple DVD player with a normal home television set. The dock provides a cabled electrical interface to a television or other home theater components—such as an audio system—that can remain permanently in place for when the present invention is used with an external system. The dock is preferably the same form-factor as a typical VCR; it will be designed to blend in with the rest of the system components that a user owns, and also be instantly recognizable for its intended function.

An infrared remote control is preferably bundled with the docking station. The remote features a comprehensive control feature set optimized to access all of the additional enhanced features available with the DVD format. Central to the design of this remote control is a highly attractive industrial design that will carefully avoid the dreaded and difficult-to-use "sea of buttons" so commonly found on consumer product remotes.

Figure 2E:
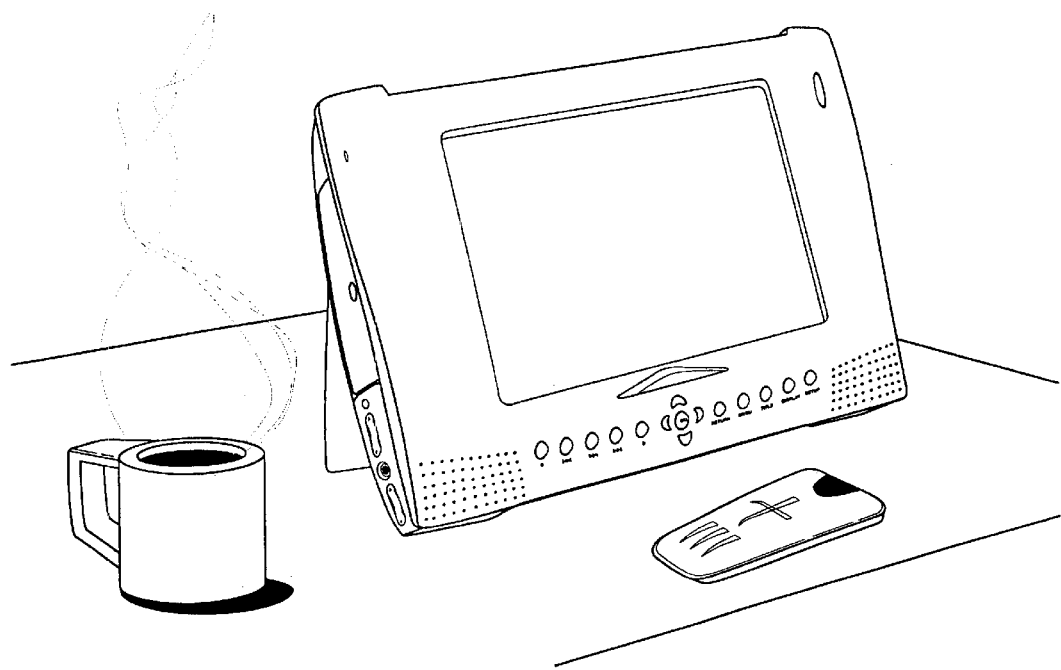
FIG. 2E illustrates a "DeskTablet™" DVD player in accordance with one embodiment of the present invention.

FIG. 2E illustrates one embodiment in accordance with one embodiment of the present invention for the desktop market is referred to herein as a "DeskTablet™" DVD player. Applications for the DeskTablet include uses such as in the bedroom, den, or kitchen, where a "fixed" unit placement is needed. This product is essentially in the same marketing space as conventional TV/VCR combination units. Similar in form factor to the "Monorail" personal computer, the thin DeskTablet form factor will be capable of either freestanding or wall hanging operation. Freed of many of the portability-driven design constraints required of the present invention mobile machine, the DeskTablet will include a high-quality integrated loudspeaker system.

Figure 3:
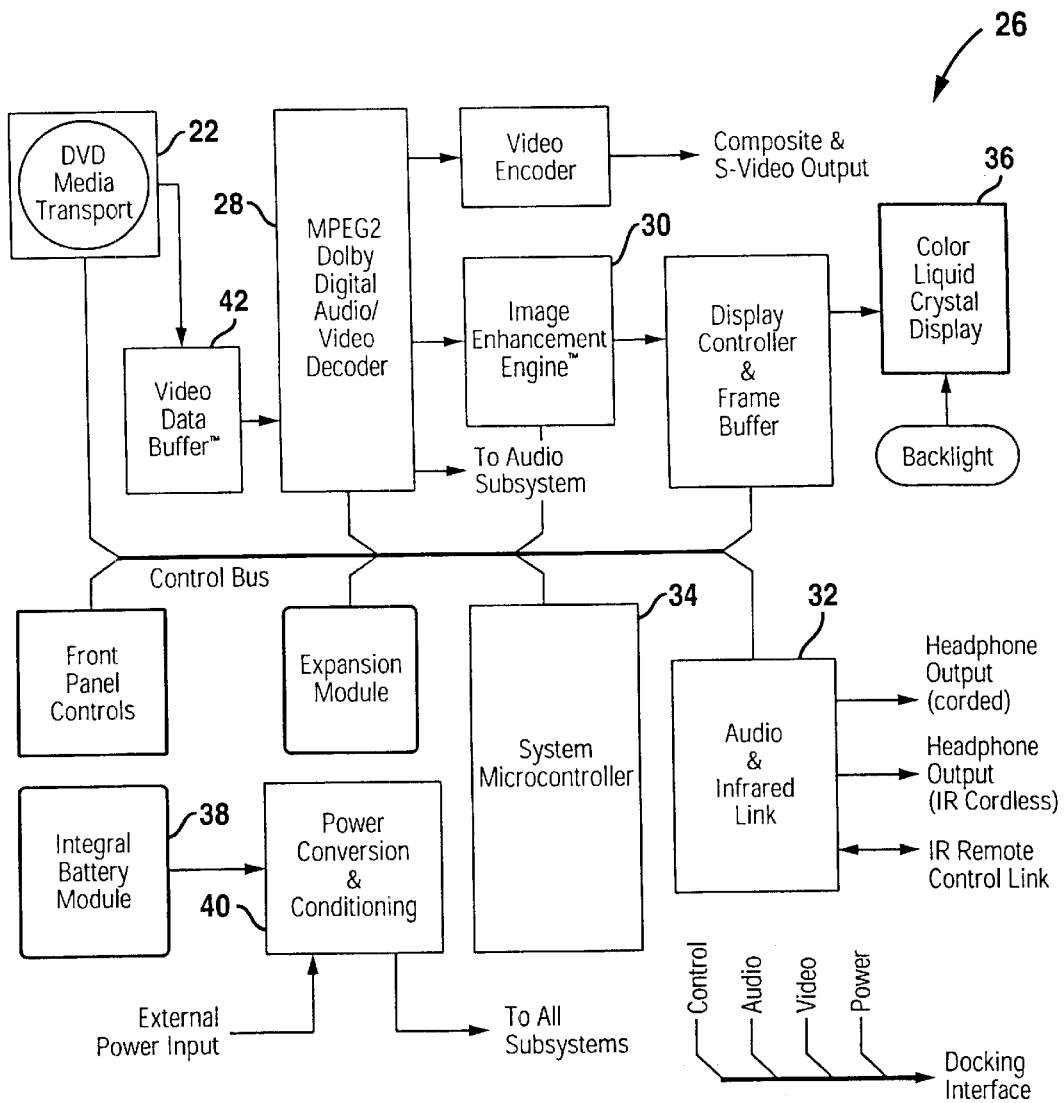
FIG. 3 is a block diagram of the electronic circuitry of the DVD player in accordance with one embodiment of the present invention.

FIG. 3 is a block diagram of the drive module 26 of the DVD player 10 of FIGS. 1 and 2. The drive module 26 includes the media transport 22 that reads the DVD. Video data from the DVD is then transferred over to a MPEG/Dolby digital (or "MPEG/AC-3") decoder 28. After decoding, an Image Enhancement Engine™ ($IE^2$) 30 deinterlaces the digital video to provide a progressively scanned video signal. Finally, the video is displayed through a display 36.

The DVD drive module 26 also includes an audio/infrared link 32, a system controller 34, a battery pack 38, a power supply 40, a video data buffer 42, and a user interface, among other illustrated components, busses, and subsystems. The components of the DVD drive module 26 are primarily housed within the housing 12 and will each be described in detail below.

The DVD transport 22 preferably uses an off-the-shelf drive module 26 designed for portable computers. Preferably, the drive module 26 is seventeen mm or less in thickness, allowing a very thin system form factor. A suitable DVD drive module 26 is available from Toshiba America Information Systems, Inc. of Tokyo, Japan. Further, the drive module 26 of the present invention is preferably physically and electronically isolated from mechanical shocks and impacts. More particularly, the drive module 26 is mechanically shock mounted in the housing 12, and data from the drive module 26 is buffered in memory for a period of time before decoding to allow sectors to be reread in the event of a shock-induced data stream discontinuity.

The MPEG/Dolby digital decoder 28 is preferably an off-the-shelf single-chip decoder targeted at consumer DVD players. It preferably performs both MPEG-1 and MPEG-2 decoding, Dolby digital ("AC-3"), MPEG, and LPCM audio decoding, has A/V synchronization, and has the characteristic that only a single memory device is required for data storage and buffering. Such decoders are available from a variety of sources, including C-Cube Microsystems of Milpitas, Calif.

The IE$^2$ 30 preferably deinterlaces digital video from DVD or any other source to provide progressively scanned video signal, including proprietary motion detection and compensation hardware. It further preferably corrects brightness, contrast, gamma, and color temperature correction for clear and accurate video display. To further improve the image, a high quality scaling engine of the IE$^2$ 30 is preferably used to convert video image from rectangular to square pixels and to scale the video for full-screen display on flat panel sizes other than 640×480.

The audio/IR link 32 (comprising one or more integrated circuit chips) decodes the Dolby digital data stream provided from MPEG2/Dolby digital decoder 28, mixes 5.1 channels down to 2 channels for conventional stereo output, and encodes/processes 5.1 channels for surround headphone output (optional module). Stereo D/A converters are provided for headphone output.

D/A converters for 5.1 channel Dolby digital stream are available on the docking module connector. An undecoded Dolby digital stream for outboard decoders is also available on the docking module connector. An optional IR transmitter for wireless headphones may be provided, as may stereo speakers with small stereo power amp for presentations or playback without headphones.

The system controller 34 is preferably a single-chip microprocessor handling most, if not all, system control functions. For example, the microprocessor preferably handles system startup and configuration, user interface & controls, feature set selection (e.g., parental control, etc.), DVD drive control, and IE$^2$, MPEG decoder, audio system, and display controller configuration. A suitable microprocessor is available as part number MC68HC16 from Motorola, Inc. of Austin, Tex.

The display 36 is preferably an 11.3" LCD display (both active and passive matrix models available) with high-output fluorescent cold cathode backlight. The display 36 preferably has 640×480 pixel resolution and 18-bit color depth. A suitable display is available from Sharp Electronics Corp. of Camas, Wash. The video controller for the display 36 provides high-resolution, flexible onscreen graphics, overlay of graphics onto full-screen video playback, and LCD drivers for direct connection to display.

The housing 12 is preferably made with a "tablet" form factor, which is easy to use and carry. The single piece housing design of the enclosure provides simplicity, ease of manufacture, ruggedness, reduced weight, and serviceability. An optional docking station allows simple one-connection hookup to external video systems.

The battery pack 38 is preferably a replaceable, rechargeable module based upon NiMH technology for high power density at low cost. Preferably the battery pack uses standard, off-the-shelf battery cells having a 40 watt-hour capacity which provides sufficient power for over 2.5 hours of continuous operation. This period of time is normally sufficient to view a full, feature-length movie.

Also shown are inputs and outputs to/from the unit. While interconnections from the system controller 34 to other components are shown as a bus, these may in fact be realized via discrete connections if appropriate for the specific off-the-shelf components chosen. The architecture of the DVD drive module 26 has been designed for modularity of components and ease of expandability.

System expansion is accomplished via an I/O option module interface, which allows the drive module 26 to interact with the video and audio subsystems, as well as the system controller 34. This interface accommodates expansion modules with functions such as alternate audio and/or video inputs and specialized audio processing, allowing the present invention to be customized by the user for a variety of applications.

Alternate product configurations are easily accommodated by substitution of key system components. Since standard components are used in many areas of the system (e.g., the DVD drive module 26), similar components can simply be substituted. For instance, a more compact unit can be built by utilizing a smaller LCD and battery. The display controller directly accommodates varying display sizes, while the power converter and battery charger are configurable for different battery sizes and technologies. More fully functioned base configurations are possible by simply including additional (optional) components for added functionality. For example, a unit with a full complement of video and audio I/O requires only the addition of extra D/A converters, a video decoder, extra connectors, and enclosure modifications.

The system software of the portable DVD player of the present invention is preferably structured into two main levels: the high-level user interface software and the low-level device control software. The software runs on the system microcontroller 34, and is preferably stored on a read only memory ("ROM") (not shown). The low-level section interfaces directly with the various hardware components of the system, interacting directly with them at a register level. It provides for power-on and initialization, configuration of the hardware components, basic device control and synchronization, and interface to the user interface software.

Between the two levels the present invention provides a "control/status" Application Program Interface ("API"). This is a moderately high level interface, with the API functions corresponding almost directly with the typical user controls—e.g., "play," "skip to next track," "show elapsed time," etc. The control functions provide a means for the user interface software to issue commands for control of the player, while the status functions allow the user interface software to acquire information about the state of the player hardware.

This architecture permits customized user interface software. The "control/status" API provides a clean break between the user interface and the low-level device control software, allowing another user interface, e.g., a customized user interface, to be substituted into the player's standard software. It will therefore be appreciated that the software architecture of the present invention can support a variety of product configurations, allowing a rich product family with excellent longevity and scalability.

A power supply 40 includes a DC-to-DC power converter to allow the use of an internal battery or external DC source. The DVD player 10 preferably derives all required internal voltages from a single DC power source. A high voltage inverter provides power needed for display back light. A charger (not shown) is used to re-charge the internal rechargeable battery. The user interface includes a straightforward control strip on the front bezel for quick access to common functions, and the software user-interface allows full-featured, yet simple and intuitive player control. Software controls rendered via high-resolution graphics can overlay video for immediate user feedback.

Figure 4:
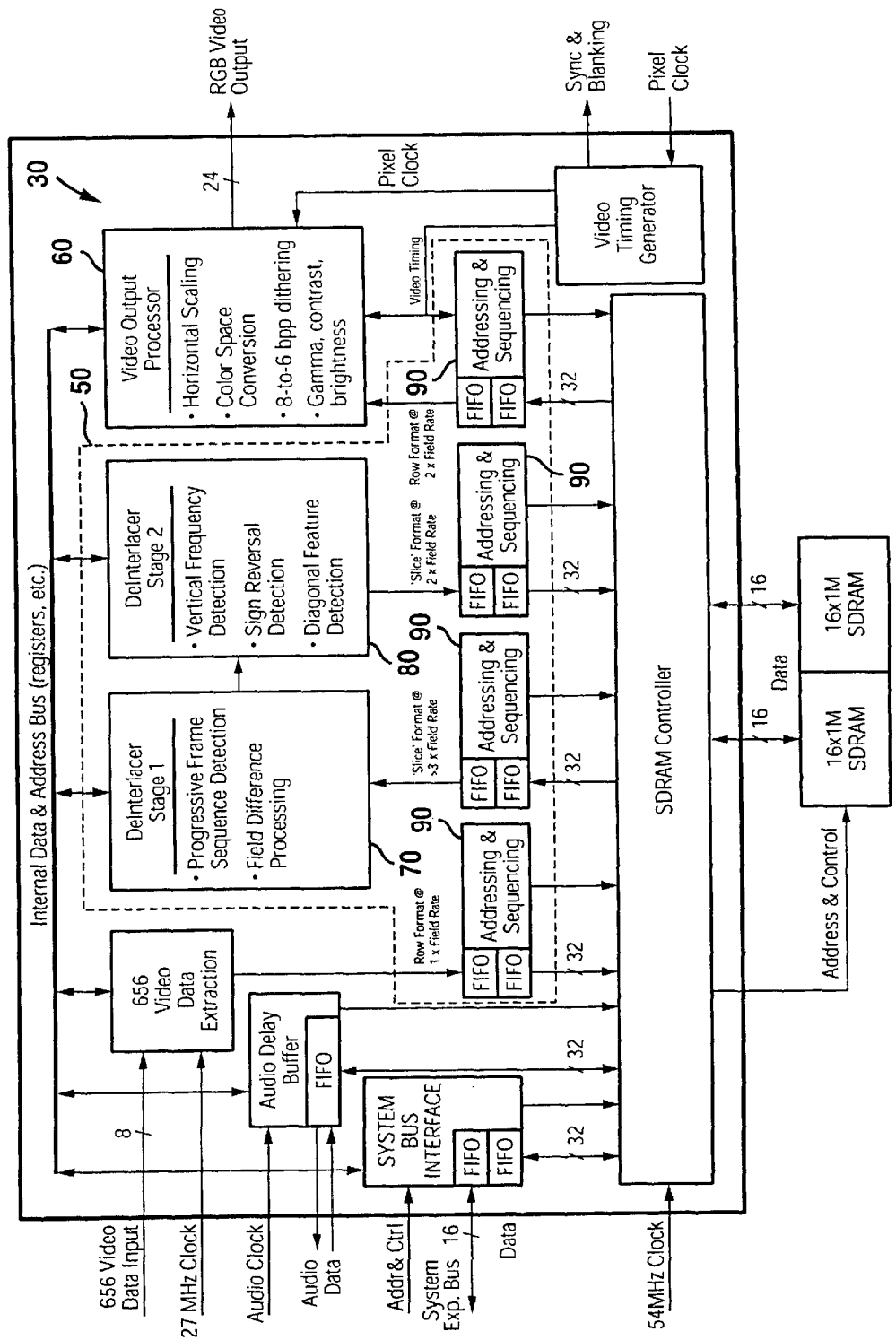
FIG. 4 illustrates a system diagram of the Image Enhancement Engine ($IE^2$) in accordance with one embodiment of the present invention.

FIG. 4 illustrates a system diagram of the Image Enhancement Engine (IE$^2$) 30 (see FIG. 3) in accordance with one embodiment of the present invention. The IE$^2$ 30 includes a two dimensional video processing chip architecture 50 and a video output processor 60. The chip architecture 50 includes a first deinterlacing stage 70 and a second deinterlacing stage 80 and a set of addressing and sequencing FIFOs 90. The first deinterlacing stage 70 includes progressive frame sequence detection and field difference processing. The second deinterlacing stage 80 includes vertical frequency detection, sign reversal detection and diagonal feature detection. The video output processor 60 includes horizontal scaling, color space conversion, 8 to 6 bpp dithering and gamma, contrast, and brightness corrections.

Figure 5:
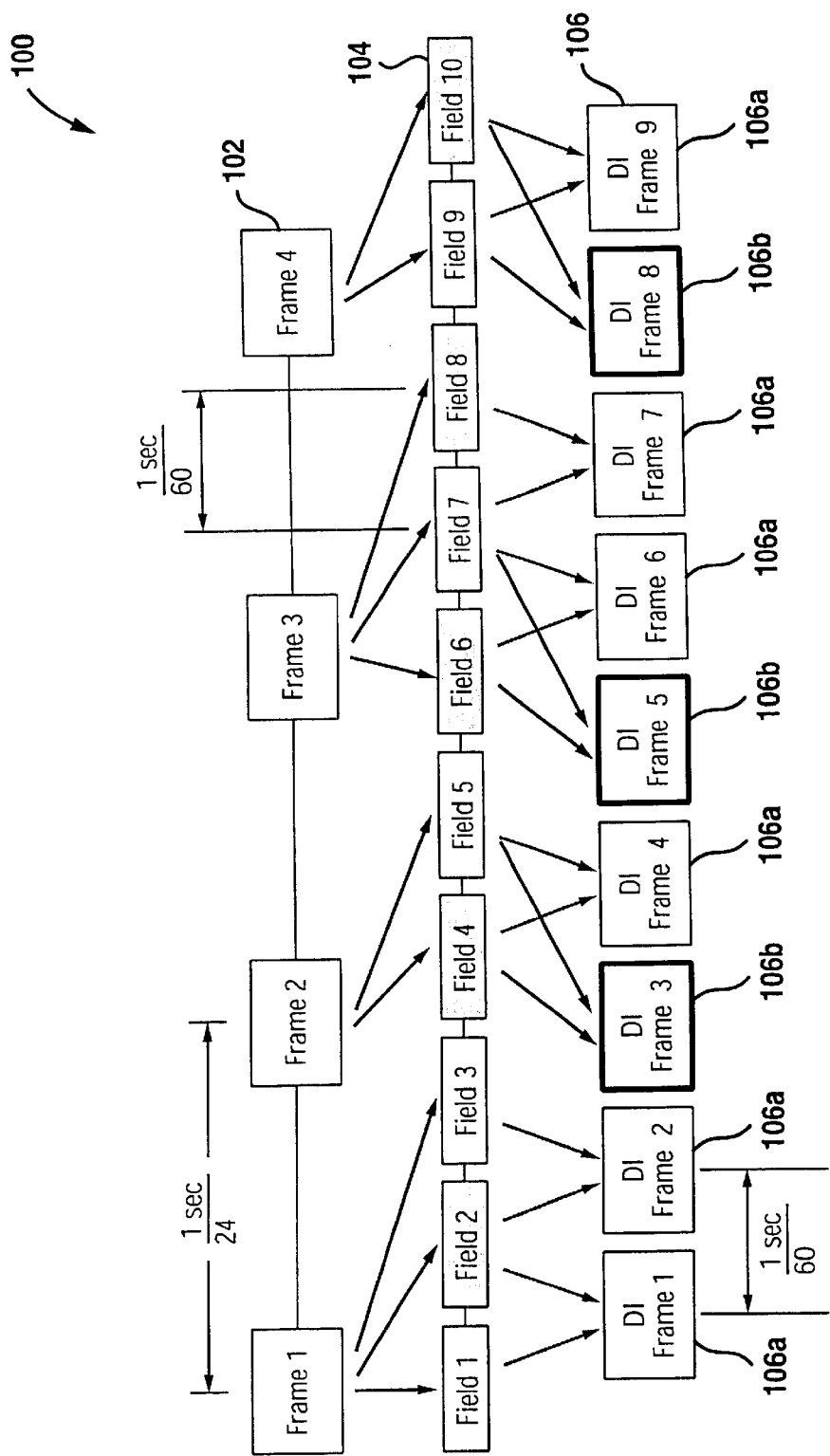
FIG. 5 illustrates a method of combining fields into frames in a deinterlacing process in accordance with one embodiment of the present invention.

The first deinterlacing stage 70 of FIG. 4 is discussed in greater detail with reference to FIGS. 5–10. FIG. 5 illustrates a method 100 of combining fields into frames in a deinterlacing process in accordance with one embodiment of the present invention. A series of film frames 102 at 24 frames per second are converted to video fields 104 at 60 fields per second. The video fields 104 are then converted to deinterlaced frames 106 by a deinterlacing process. The deinterlaced frames 106a are created by combining the two most recent fields into a single frame, but the deinterlaced frames 106b are created by combination of different video fields and distinguished by bold arrows and bold borders.

Referring to FIG. 5, when Field 2 is the "current" field, then DI Frame 1 is created by combining Field 1 (the "last" field) and Field 2 (the "current" field). DI Frame 2 is created in the same way by combining Field 3 with Field 2 when Field 3 is the current field. In contrast, when Field 4 is the current field, combining Field 4 and Field 5 creates DI Frame 3. In this case, the combination is the "current" and the "next" fields. When the field combination is done in this way, all of the deinterlaced frames 106 will be created by combining fields that originate from the same source frame. Because these combining fields originate from the same source frame, they are time correlated. Therefore, no motion artifacts exist in the deinterlaced frames 106.

Combining fields into frames as shown in FIG. 5 requires identification of the type of motion picture used in the original source. First, a source must be identified to be one in which original progressive frames exist; second, the sequencing used to create fields from the frames of the original source must be determined in order to assemble video fields into frames and avoid artifacts.

Figure 6:
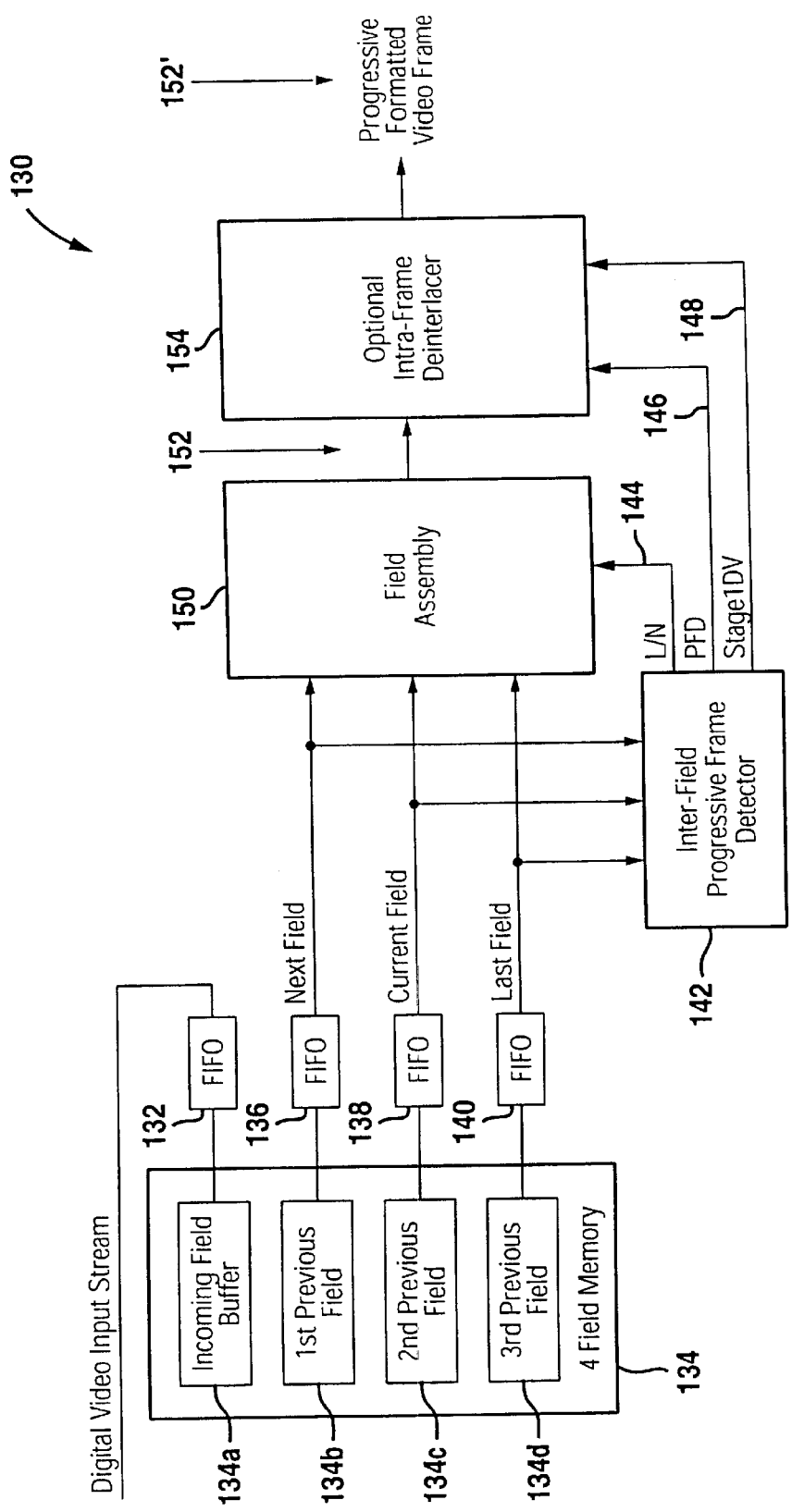
FIG. 6 is a block diagram of a video deinterlacer in accordance with one embodiment of the present invention.

FIG. 6 is a block diagram of a video deinterlacer 130 in accordance with one embodiment of the present invention. A digital video stream enters the deinterlacer 130 through a FIFO memory module 132 before being written into a digital memory unit 134. The digital memory unit 134 has the capacity to store four complete video fields in a set of field buffers 134a–d. The incoming field is written to each of the field buffers 134a–d in sequence. Therefore, the first incoming video field is written to field buffer 134a, the second incoming video field is written to field buffer 134b, etc. After field buffer 134d is filled, the next incoming video field is written to field buffer 134a again.

During the time period of one field, the incoming field is written to one field buffer 134, and the three previous fields are read from the other field buffers 134. For example, if as shown in FIG. 6, the incoming field is written to 134a, then field buffers 134b–d are being read into a set of FIFO memories 136, 138, and 140. The FIFO memories 136, 138 and 140 are provided to accommodate the reading and writing of the four video fields into a single physical memory unit 134, and also to decouple the clocking domains of the incoming video, the memory unit 134, and the subsequent deinterlace processing stages.

The labeling of the field buffers in 134a–d as "incoming," "1st," 2nd," and "3rd" previous fields are from the point of view of the incoming video streams. The outputs of the three read FIFOs 136, 138, and 140 are labeled Next Field, Current Field, and Last Field respectively. This labeling is from the point of view of the deinterlace processor 130 and implies that deinterlace processing imposes a delay of approximately two field time periods on the video stream.

The outputs of FIFOs 136, 138, and 140 are synchronized so that the three fields presented to subsequent processing stages are spatially concurrent. The three fields are then presented as inputs to an inter-field progressive frame detector 142 which produces a last/next (L/N) signal 144, a progressive frame detection (PFD) signal 146 and a stage 1 detection value (Stage1DV) 148. The L/N signal 144 is a control signal that instructs a field assembly stage 150 to assemble the Current Field with the Last Field or the Next Field, which are three sequential fields from the input video stream.

With the three fields, the field assembly stage 150 produces a progressively formatted output frame 152. If the Current Field is even, then the Next and Last Fields must be odd and vice versa. Therefore, the progressively formatted frame 152 output of the field assembly stage 150 will always be a combination of one even and one odd field. This is important because the correct assembly of fields into progressive frames requires one even field and one odd field for input.

The optional intra-frame deinterlacer 154 may provide additional processing to remove artifacts that occur within the output frame 152 under certain conditions, such as when the PFD signal 146 is de-asserted. If the frame detector 142 detects that the incoming video signals were originally from a source that contains progressive frames, the PFD signal 146 is asserted. Three original types of source video are detected: film at 24 frames per second, computer animations or frames rendered at 30 frames per second, or still images, in which no motion occurs in the image over a period of several fields. When the PFD signal 146 is asserted, the optional processor 154 is disabled.

However, if the frame detector 142 is unable to detect a progressive frame sequence from the incoming video fields, then it will set the L/N signal 144 to always assemble Current and Last fields in the field assembly stage 150. Then, the frame detector 142 de-asserts the PFD signal 146, which informs the optional deinterlacer 154 that artifacts may be present in the output frame 152 and that further processing may be necessary to remove the artifacts and create a final progressive output frame 152'.

Detection of a progressive frame sequence requires keeping a history of the preceding fields. However, the progressive frame detector 142 can look only one field ahead. In cases where a large transition in the image occurs, it is possible for the progressive frame sequence to change because of edits in the original video source. These changes could require changes in the way frames are created from incoming fields, but it is not possible to know in advance of the arrival of the incoming fields.

For this reason, the progressive frame detector 142 must be capable of detecting transitions in the motion picture because transitions may indicate edits that may change the progressive field sequencing. If a transition is detected, the progressive frame detector 142 will de-assert the PFD signal 146 for the time period required to determine the new progressive frame sequence. This allows motion artifacts to be removed by the optional deinterlacer 154 during the time period needed to reacquire the progressive frame sequence. In cases where a progressive frame sequence is not detected and the PFD output is not asserted, the Stage1DV 148 output contains magnitude information related to the amount of motion present in the image. This information may be used in the optional deinterlacer 154 to further process the image.

Figure 7:
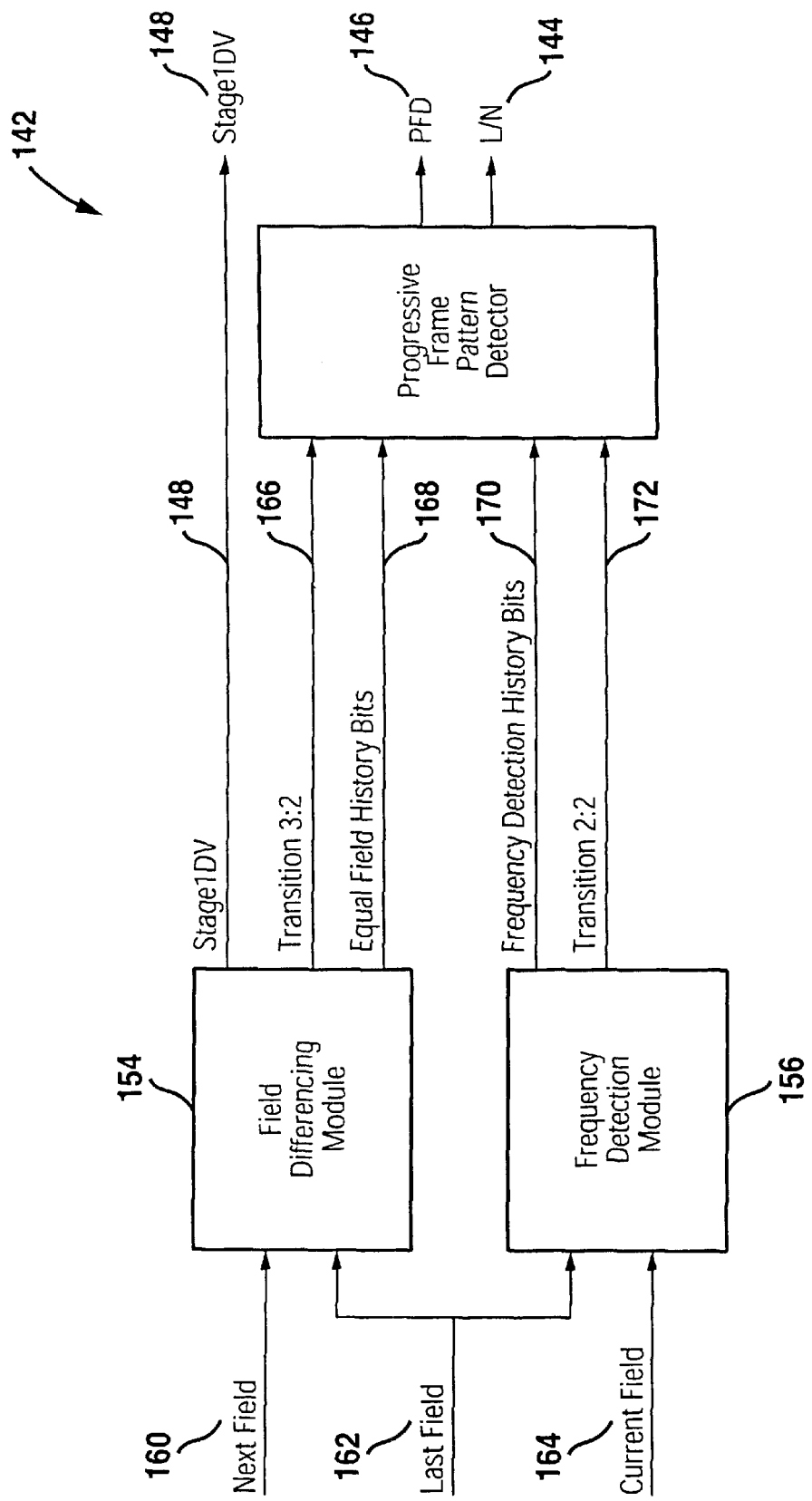
FIG. 7 is a system diagram of a progressive frame detector in accordance with one embodiment of the present invention.

FIG. 7 is a system diagram of a progressive frame detector 142 in accordance with one embodiment of the present invention. The frame detector 142 includes a field differencing module 154, a frequency detection module 156, and a progressive frame pattern detection (PFPD) module 158. The field differencing module 154 calculates the difference between a Next Field 160 and a Last Field 162, processes the differences into the Stage1DV 148, a transition detection 3:2 value 166, and a plurality of equal field history bits 168.

The frequency detection module 156 combines a Current Field 164 and the Last Field 162 into a frame and then detects the vertical high frequencies that result from motion artifacts. Then, the frequency detection module 156 outputs a number of frequency detection history bits 170 and a transition detection 2:2 value 172. Finally, the PFPD 158 takes as input the transition detection 3:2 value 166, the plurality of equal field history bits 168, the frequency detection history bits 170 and the transition detection 2:2 value 172 to produce the L/N signal 144 and the PFD signal 146.

Figure 8:
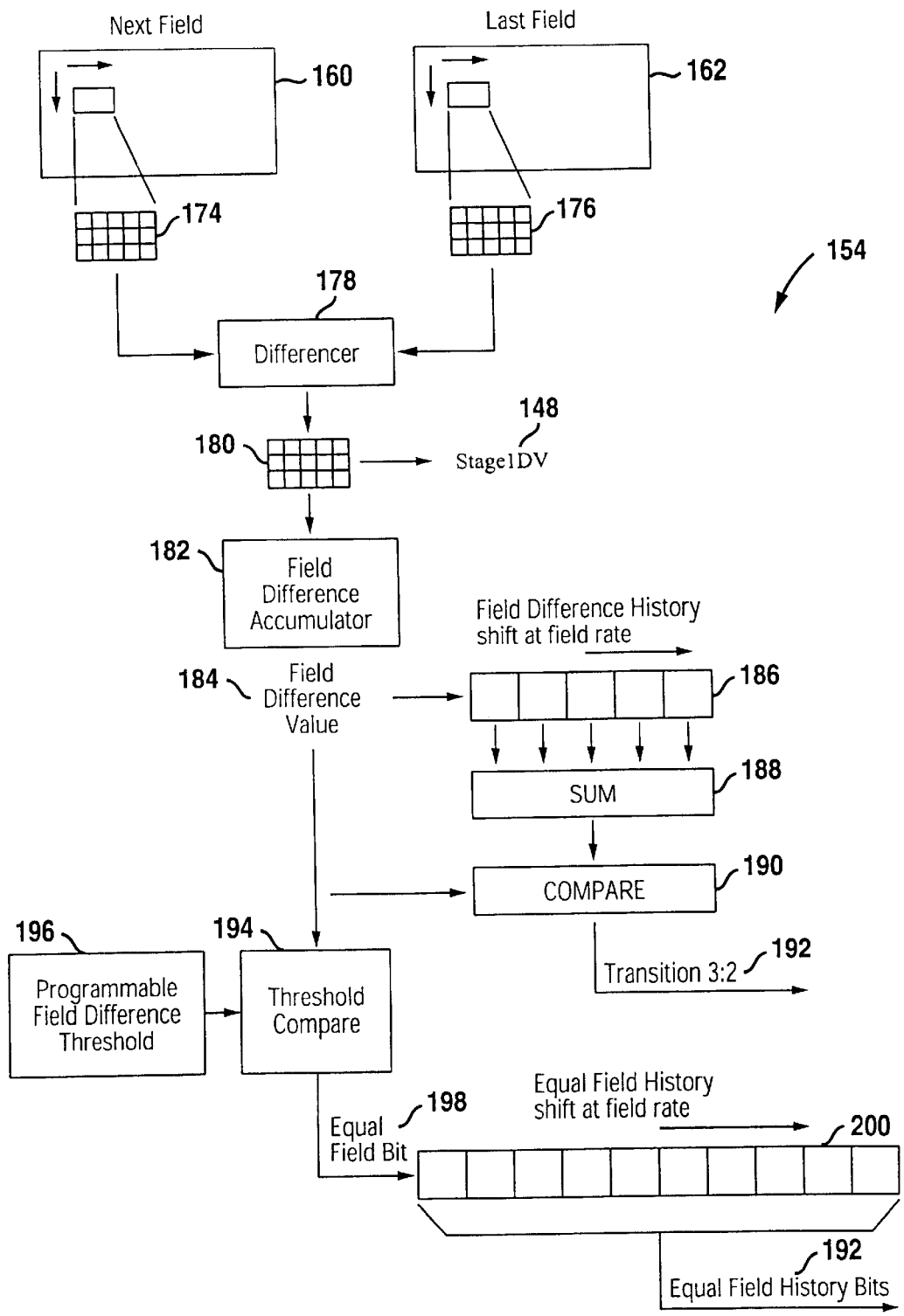
FIG. 8 is a flow diagram of the processing steps within a field-differencing module in accordance with one embodiment of the present invention.

FIG. 8 is a flow diagram of the processing steps within the field-differencing module 154 in accordance with one embodiment of the present invention. A Next array of pixels 174, which is a subset of the Next Field 160, and a Last array of pixels 176, which is a subset of the Last Field 162 are the inputs to a differencer 178. The Next and Last pixel arrays 174 and 176 can be viewed as windows moving across their respective fields. The "window" is moved from left to right and top to bottom. Each time the windows are moved, a new difference is computed. The result of the difference operation 178 is an array of differences 180.

Using a weighted average of the array of differences 180, the Stage1DV 148 is computed. The weighting is such that the difference values near the center of the array of differences have the most influence on the weighted average. The array of differences 180 is also input into a field difference accumulator 182 that sums the differences over the entire field to produce a field difference value 184. The previous five field difference values are stored in a memory module 186 and are summed in an operation 188.

The sum of the previous five field difference values is compared to the current field difference value in an operation 190, and the result is the Transition 3:2 output signal 192. The current field difference value 184 is compared in a threshold operation 194 with the value in a programmable field difference register 196. The result of the threshold operation 194 is an equal field bit 198, which is a single bit that indicates that the Next Field 160 and Last Field 162 are the same. The previous equal field history bits 168 are stored in a memory module 200 and are used in the PFPD 158 of FIG. 7.

Figure 9:
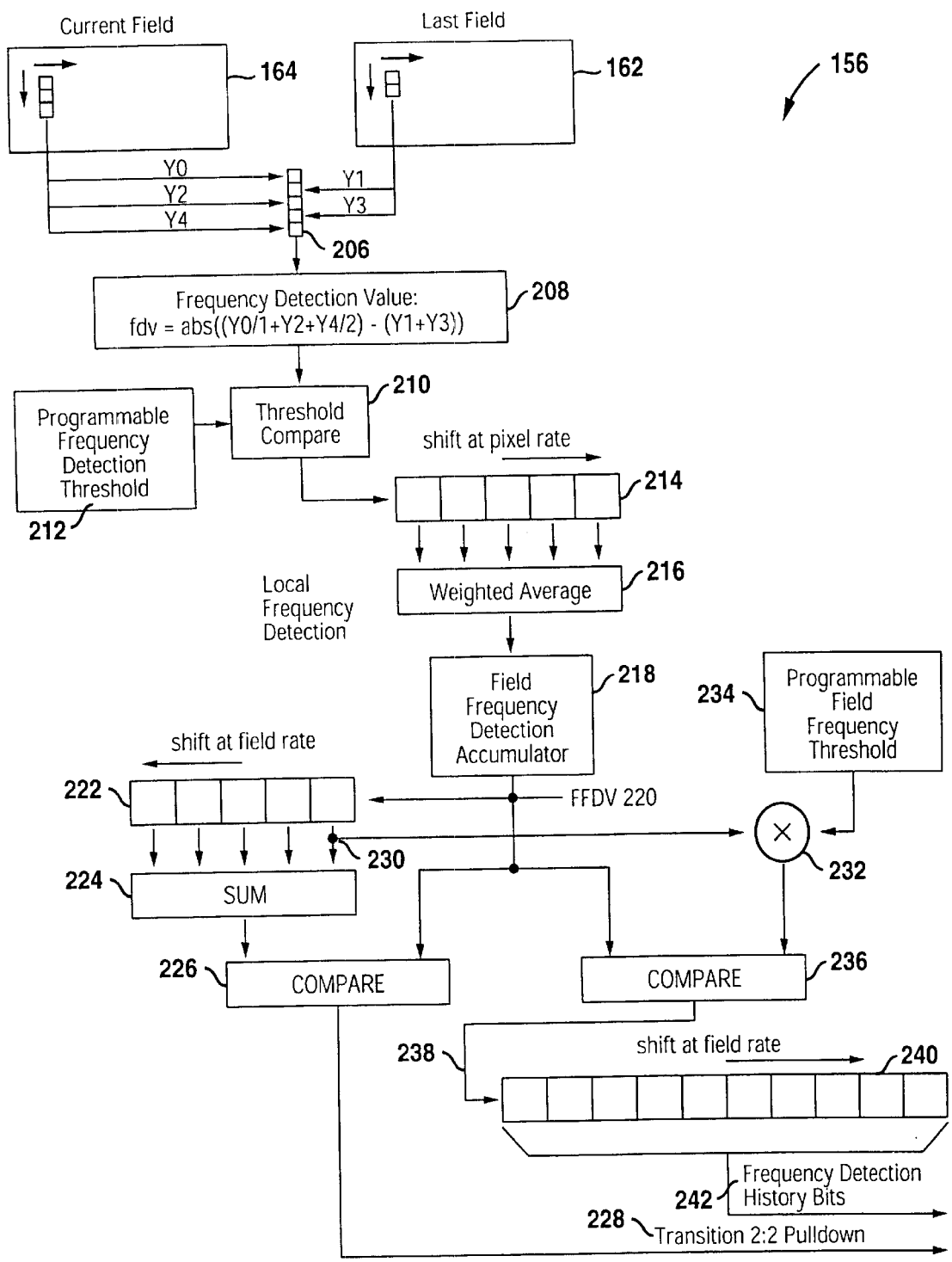
FIG. 9 illustrates details of the frequency detection module in accordance with one embodiment of the present invention.

FIG. 9 illustrates details of the frequency detection module 156 in accordance with one embodiment of the present invention. Vertically adjacent pixels 206 from the Current Field 164 and the Last Field 162 are assembled, as they would appear spatially on a display. A frequency detection value is calculated in an operation 208. This calculation is performed to detect the frequencies that are associated with deinterlaced motion artifacts. In an operation 210, the output of the frequency detection is compared with a programmable threshold value 212. The results of five adjacent frequency detection values are stored in a memory module 214 and are summed in an operation 216.

The output of the operation 216 is accumulated over the entire field period in a field frequency detection accumulator 218 to produce a field frequency detection value 220. The field frequency detection value 220 is stored in a memory module 222 that contains the previous 5 field frequency detection values. The five previous field frequency detection values are summed in an operation 224 and the results are compared to the current frequency detection value 220 in an operation 226. The result of this comparison in operation 226 is the Transition 2:2 bit 228, which indicates that a transition has occurred in the 2:2 sequence.

As part of a parallel process, a first previous field detection value 230 that was stored in the memory module 222 is transferred to a multiplier 232, and multiplied with a value stored in a programmable field frequency threshold register 234. The result of the multiplication is compared in an operation 236 to the current field frequency detection value 220. The result is a relative frequency difference bit 238, which is then stored in a memory module 240. The previous ten relative frequency difference bits 242 are output to the PFPD module 158.

Figure 10:
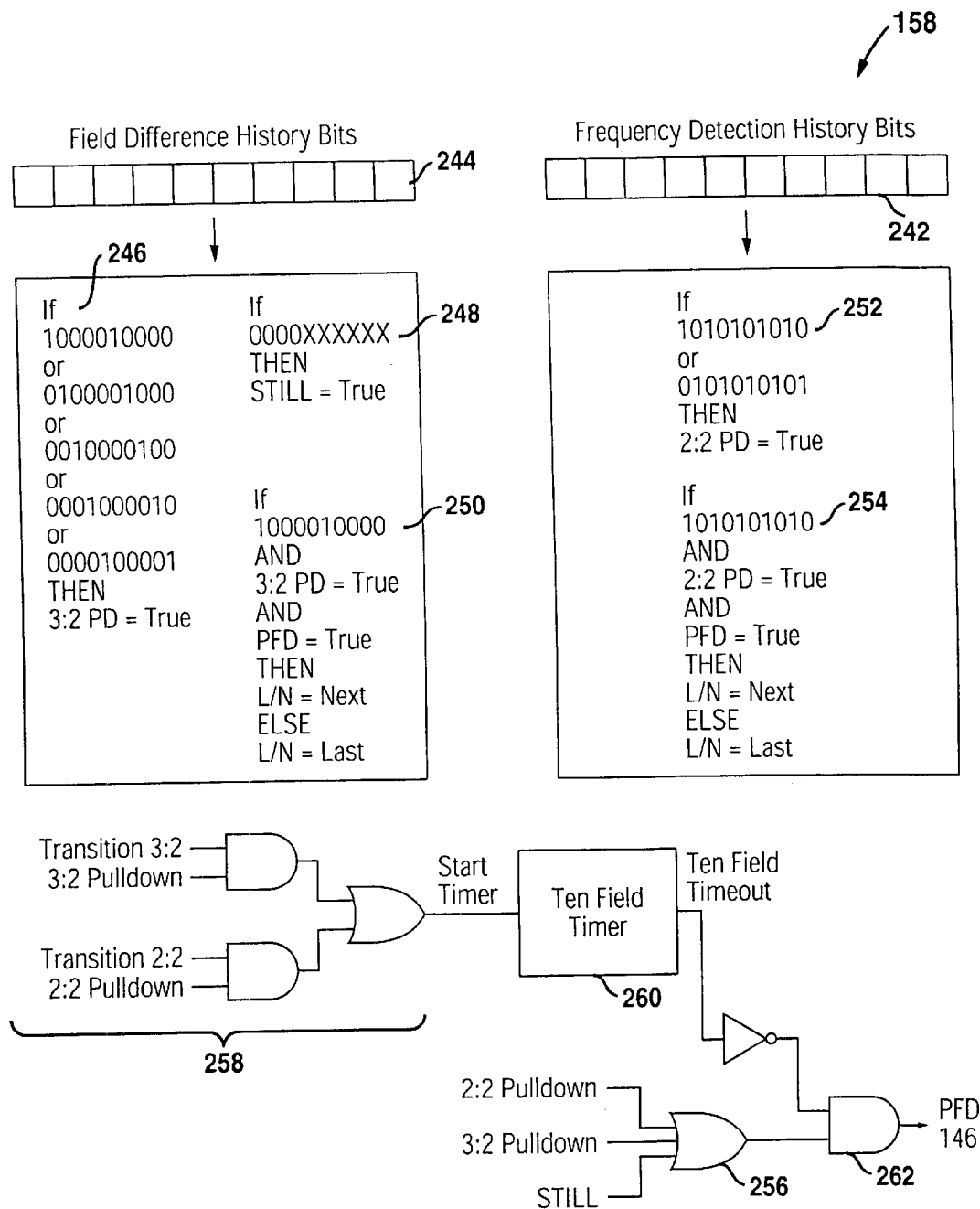
FIG. 10 is a system diagram of the PFPD module in accordance with one embodiment of the present invention.

FIG. 10 is a system diagram of the PFPD module 158 in accordance with one embodiment of the present invention. The PFPD module 158 performs logical operations on a set of field difference history bits 244, the frequency detection history bits 242, the transition 3:2 value 192 (see FIG. 8), and the transition 2:2 value 228 (see FIG. 9). After the input of the field difference history bits 244, a logical operation 246 determines the 3:2 pulldown detection bit by looking for patterns in which every fifth field is equal. Then, a logical operation 248 detects still images by setting the STILL bit when the most recent four field differences are zeros. The state of the L/N control signal is set by a logical operation 250.

From the input of the frequency detection history bits 242, a logical operation 252 detects a 2:2 pulldown detection bit by searching for alternating patterns of high frequency and low frequencies in successive field times and monitoring the frequency detection history bits 242. Then, a logical operation 254 determines the L/N control signal for the 2:2 pulldown case. The PFD signal 146 is determined from the 3:2 pulldown detection bit, the transition 3:2 value 192, the 2:2 pulldown bit, and the transition 2:2 value 228.

Three source types of progressive frames are detected. Film converted to video using 3:2 pulldown is detected by computing the difference between pairs of even fields or pairs of odd fields and looking for the condition in which every fifth difference is zero. This condition is indicated by the 3:2 pulldown signal. Computer generated animations using 2:2 pulldown are detected using a frequency detection method which looks for the frequencies associated with motion artifacts in every second combined frame, indicated by the 2:2 pulldown signal. Still images are detected when the field differences are zero for several consecutive fields, indicated by the STILL signal.

Progressive frames are simply the logical OR of these three signals as shown by a logical OR gate 256. However, transitions must also be taken into account. As mentioned above, a transition is a large change in the field sequence that results from edits, or dropout of the video signal. If a large change is detected, then progressive frame detection, which depends on a history of several fields, may be unreliable for the period required to establish a progressive frame pattern.

In the examples illustrated, this period is ten field times or about one-sixth of a second for 60 Hz fields.

In a set of logical operation 258, a pulse is generated under two conditions. One is that a 3:2 pulldown sequence is detected and a transition occurs; the second is a 2:2 pulldown sequence is detected and a transition is detected in the sequence. Either of these cases triggers a timer 260 which generates a pulse of a ten field duration, since ten fields is the time period required to establish a new progressive sequence. During this time, a logical AND gate 262 disables the PFD bit 146. As mentioned previously, if the PFD bit 146 is not asserted, then the optional intra-frame deinterlace processor 154 (illustrated in FIG. 6) may remove motion artifacts during the timeout period.

It will therefore be appreciated that the progressive frame detecting process of the present invention provides for elimination of edge artifacts in a video image. This is accomplished by identifying the type of the original motion picture and using that information to help combine video fields in the deinterlacing process. The combination of these techniques provides a low-artifact, high-resolution deinterlaced image.

Figure 11:
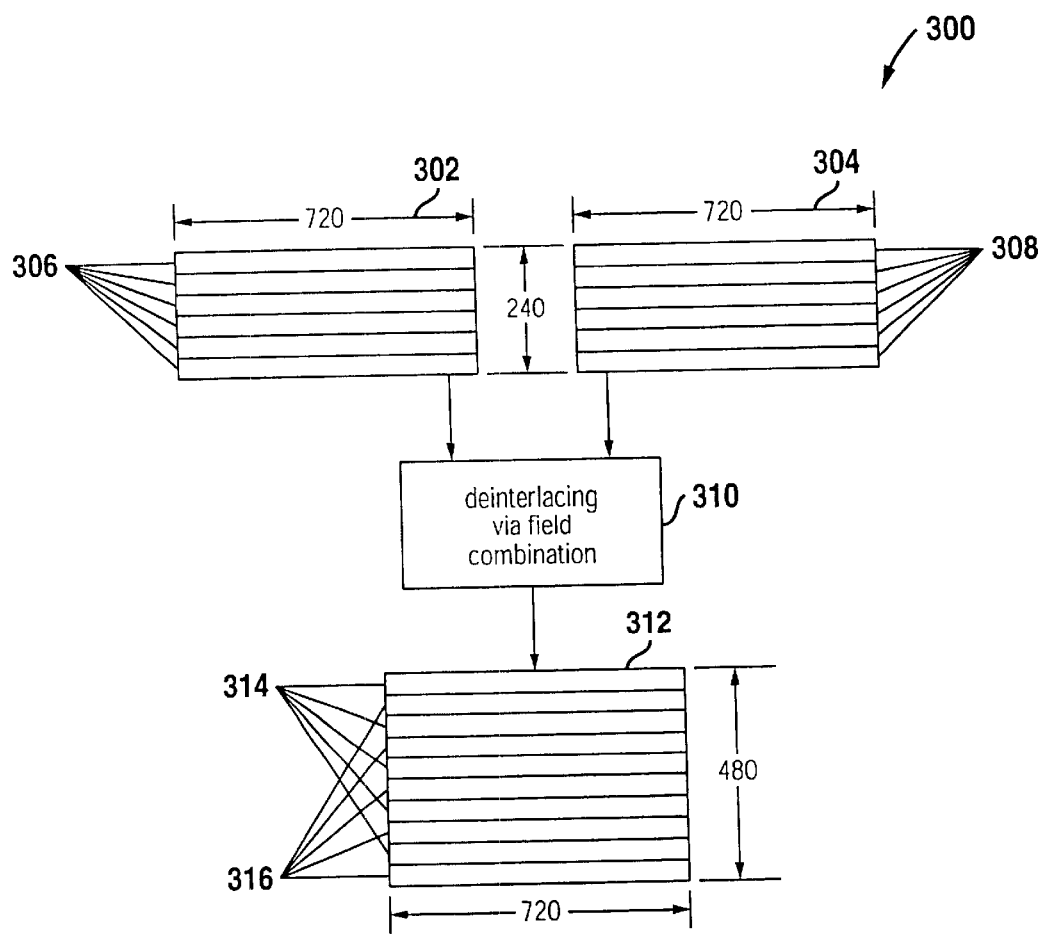
FIG. 11 is an illustration of a deinterlace process in accordance with one embodiment of the present invention.

The second deinterlacing stage 80 of FIG. 4 is discussed in greater detail with reference to FIGS. 11–21. FIG. 11 illustrates a method 300 of deinterlace processing. A video field 302 containing scan lines 306, and a previous video field 304 containing scan lines 308 is fed into a field combination deinterlace processor 310. Each of the video fields is 720 pixels by 280 pixels. The result is a 720 pixels by 480 pixels combined frame 312 with scan lines 314 sourced from video field 302 and scan lines 316 sourced from video field 304.

When this simple deinterlacing of the prior art is performed, and a motion picture formatted for an interlace display is converted to a progressive format, a noticeable "artifact" or error arises because the image content of vertically adjacent lines is time shifted by $1/60^{th}$ second as noted previously. The error is most visible around the edges of objects that are in motion.

Figure 12:
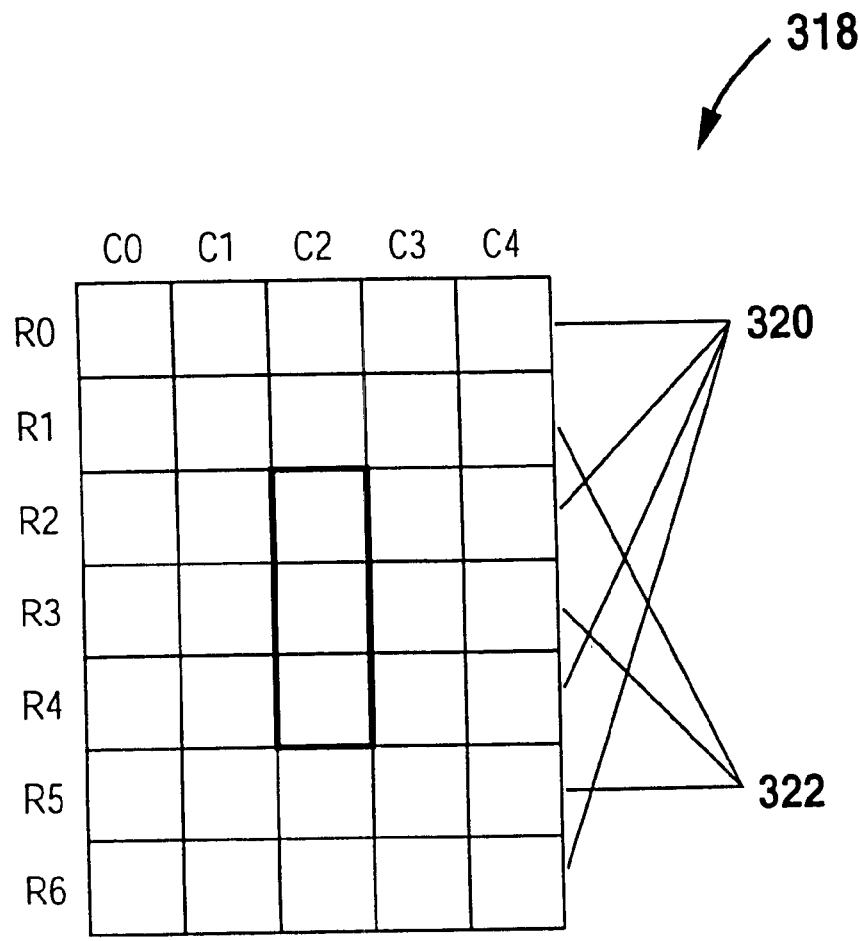
FIG. 12 shows a two-dimensional array of pixel values used to describe the present invention.

FIG. 12 shows a two-dimensional array of pixel values 318 that is a subset of the combined frame 312 of FIG. 11 that will be used to describe the present invention by way of example. The array of pixels 318 is shown having a width of 5 and a height of 7 pixels. The array 318 is labeled across the top C0 to C4 indicating columns and is labeled vertically along the left side from the top to bottom R0 to R6 indicating rows. The pixels contained in array 318 are used to compute a frequency detection value. In addition, the array 318 is also used to detect diagonal features and finally to compute the resulting pixel.

The array 318 is positioned so that a set of even numbered rows 320 contain pixels from the most recent or "current" field of the original source, and a set of odd numbered rows 322 contain pixels from the previous field. The array 318 is then stepped across the combined frame 312 (see FIG. 11) from left to right horizontally. Each step causes the pixels in each of columns C1, C2, and C3 and C4 to shift to the column to its immediate left. The pixels in column C0 shift out of the array 318, and a new column of pixels shifts into column C4.

After the array 318 has been stepped across all the horizontal positions of combined frame 312, it is stepped down vertically by two pixels and returned to the left side of the combined frame 312. Therefore, even numbered rows 320 contain pixels from the most recent field and odd numbered lines 322 contain pixels from the previous field.

The process then repeats itself as array 318 is then stepped across the combined frame 312 again from left to right horizontally. At each position in the two-dimensional array, a detection value (DV) is calculated.

Figure 13:
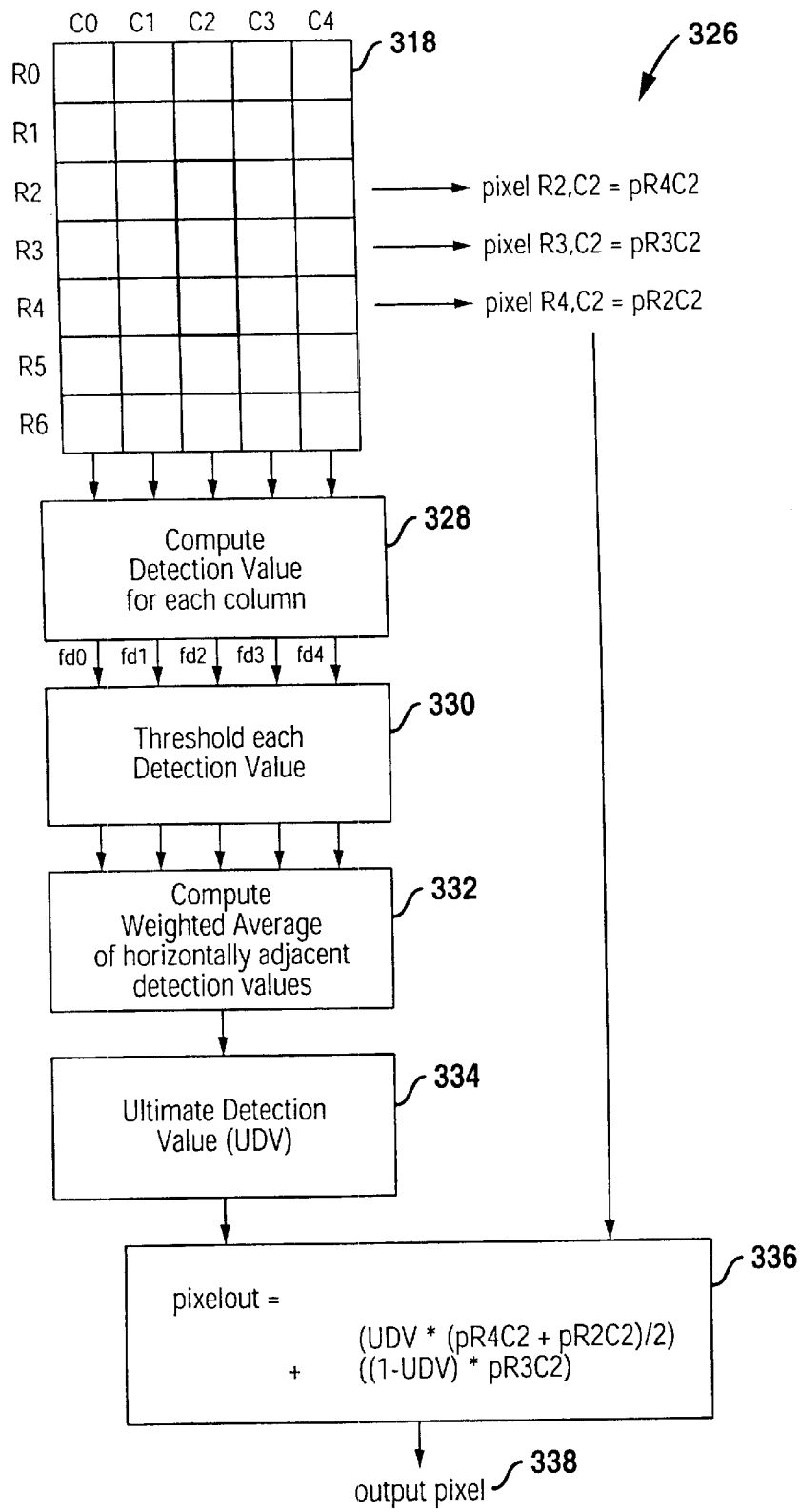
FIG. 13 is a diagram illustrating a method for using obtaining an output pixel from the two-dimensional array of FIG. 12 in accordance with one embodiment of the present invention.

FIG. 13 illustrates a method 326 for obtaining an output pixel 338 from the two-dimensional array 318. In an operation 328, a frequency detection value is obtained using the seven pixels of each column of the two-dimensional array 318. Because there are five columns, there are five frequency detection operations performed, producing a set of detection values fd0, fd1, fd2, fd3, and fd4. Next, an operation 330 thresholds the set of detection values fd0–fd4. Then, in an operation 332, the set of detection values fd0–fd4 is combined in a weighted average to arrive at an ultimate detection value (UDV) 334.

The weighting factors may be variables. One weighting example is the following: UDV=(fd0+(2*fd1)+(8*fd2)+(2*fd3)+fd4)/14. The weighting causes frequency detection values closest to the center of array 318 to have the greatest influence on the UDV 334. In this way, using five horizontally adjacent frequency detection values results in a low pass filtering operation providing smoother transitions between areas within the combined frame 312 where motion artifacts do and do not exist.

The UDV 334 computed in operation 332 is used to control a mixing operation 336, which preferably implements the following equation: pixelout =(UDV*(pR2C2+pR4C2)/2)+((1−UDV)*pR3C2) where pixelout is the new output pixel of the deinterlacing operation, pR2C2 is a pixel in the array 318 at location Row 2, Column 2, pR4C2 is a pixel in the array 318 at location Row 4, Column 2, and pR3C2 is a pixel in the array 318 at location Row 3, Column 2.

The result of the mixing operation is that the new value of pixel pR3C2 of the array 318 depends on the UDV 334. If no motion is detected by the calculation of the UDV 334, then the pixel at pR3C2 will be the unmodified value of the pixel at that position in the previous field. If a large UDV 334, i.e., a value of 1 results, then a strong motion artifact has been detected, and the value of pR3C2 is computed by averaging the values of pR2C3 and pR4C3 of the array 318. The averaged result will not show motion artifacts because it is created from values of the most recent field that are time correlated with the most recent field. Detection values that are between 0 and 1 will cause the pixel at pR3C2 to be a mix of pR3C2 and the average of pR2C3 and pR4C3.

Figure 14A:
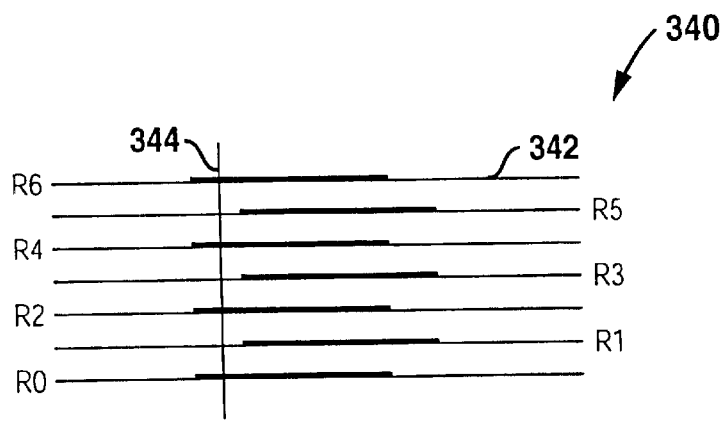
FIG. 14A is an illustration used to describe the method in accordance with one embodiment of the present invention.

FIG. 14A illustrates an image 340 showing operation 328 in greater detail. The image 340 shows the computation of a single frequency detection value for one column of array 318. Image 340 includes a distorted object 342 which is effected by an interlace motion artifact. The image is sampled along a line 344, which is shown for exemplary purposes. This sampling corresponds to one of the columns in the two-dimensional array 318. In this example, line 344 passes through an area where artifacts exist, but in general, a sampling of vertical adjacent pixels may or may not contain artifacts.

Figure 14B:
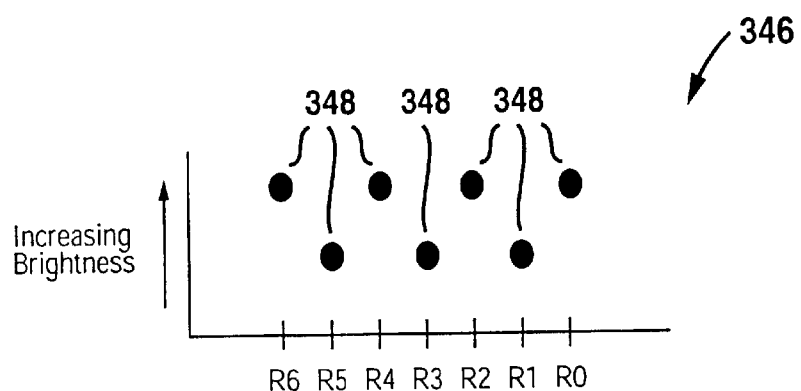
FIG. 14B is a graph of a set of samples from the sampling line of FIG. 14A.

FIG. 14B is a graph 346 of a set of samples 348 obtained by sampling along line 344 of FIG. 14A. The set of samples 348 are plotted with the row numbers along the horizontal axis and the brightness or intensity of the pixel along the vertical axis. From graph 346, it is apparent that the areas where motion artifacts exist, such as the set of samples 348, will show a characteristic frequency. This is frequency in space rather than in time and is most conveniently expressed as cycles per line rather than cycles per second or Hertz. The characteristic frequency is 1 cycle/2 lines or 0.5 cycle/line.

Figure 14C:
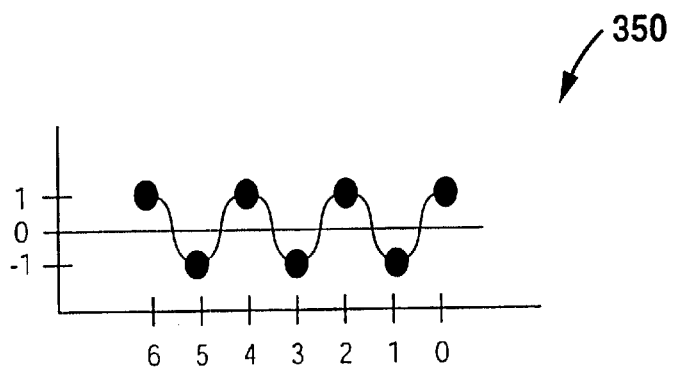
FIG. 14C is a graph of a sampled cosine wave.

FIG. 14C is a graph of a sampled cosine wave 350. The characteristic frequency created by the motion artifact is detected by multiplying the set of samples 348 by the sampled cosine wave 350. The sampled cosine wave 350 has a frequency equal to the characteristic frequency of the motion artifact. Then, the result is integrated using the following equation:

$$fd = \sum_{R=0}^{R=6} Y(R)\cos(2R\pi * 0.5 \text{ cycle/line})$$

where fd is the frequency detection value for one column of array 318, R is a line index corresponding to the R0 . . . R6 of array 318 and has the units "line," and Y(R) is the set of vertically adjacent samples 348.

The expression cos (2πR*0.5 cycle/line) simplifies to 1 for R=0, 2, 4, and 6 and −1 for R=1, 3, and 5. If 1 and −1 are substituted for R0 . . . R6, the frequency detection equation becomes: fd=(Y6/2+Y4+Y2+Y0/2)−(Y5+Y3+Y1). Note that Y6 Y0 are divided by 2 because the integration is over the limits 0 to 6. The final fd is the absolute value: fd=Abs(fd). The method 326 of FIG. 13 is repeated for each column in array 318, producing the set of frequency detection values 330.

Figure 15:
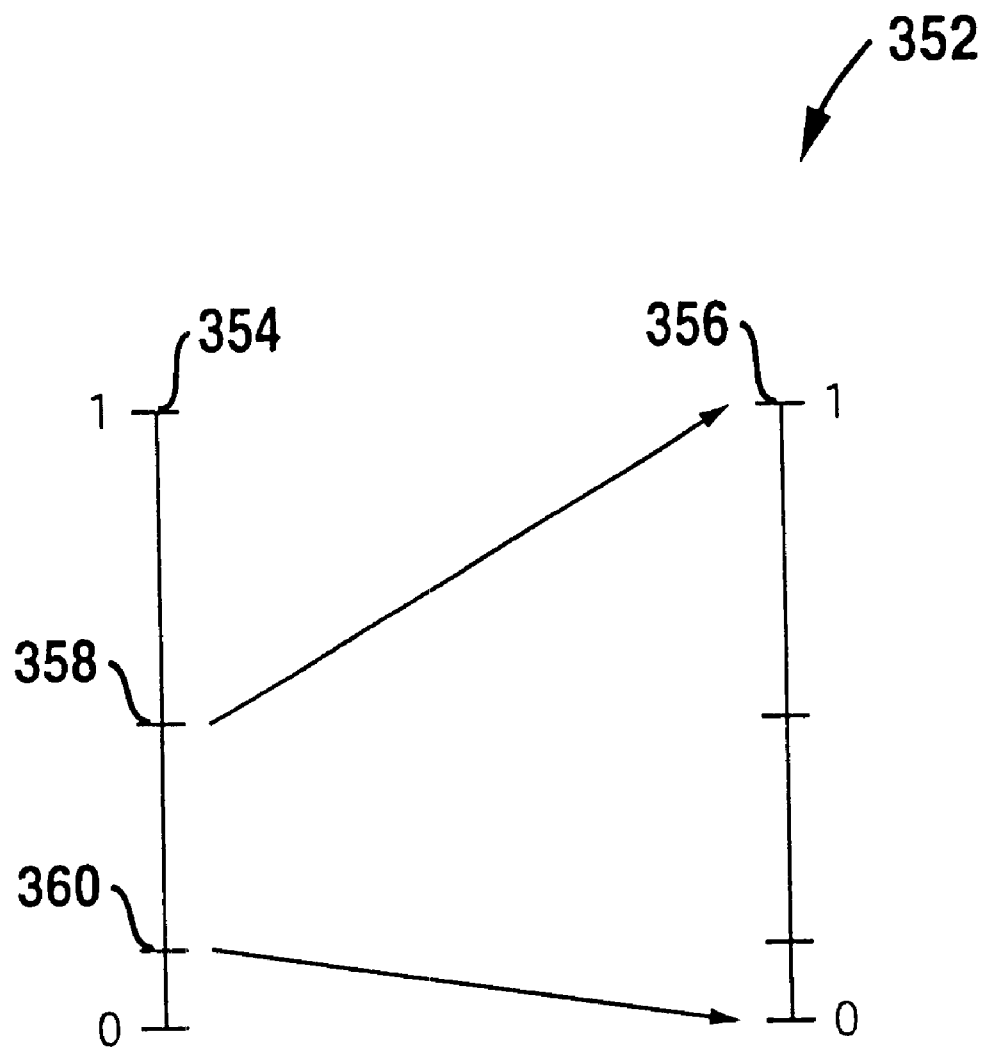
FIG. 15 is an illustration used to describe the method of thresholding a detection value in accordance with one embodiment of the present invention.

FIG. 15 is a graph 352 illustrating thresholding operation 330 in greater detail. Each fd is a number in the range 0 to 1. Graph 352 includes a non-thresholded scale 354 from which values are thresholded to the thresholded scale 356. Thresholding sets all values above the upper threshold point 358 to the value of 1. All values below the lower threshold point 360 are set to a value of 0. Values between the upper and lower thresholds are expanded to the range 0 to 1. Thresholding can be described with the following equation: tdf=(ptfd−LTH)/UTH where tdf is the thresholded frequency detection value, pthfd is the pre-thresholded frequency detection value (the output of operation 328), LTH is the lower threshold value and UTH is the upper threshold value. If tfd>1.0, then tfd=1.0. Otherwise, if tfd<0 then tfd=0.

It will therefore be appreciated that the deinterlacing process of the present invention provides good vertical resolution without creating edge artifacts in moving objects in a video image. This is accomplished by employing two-field interlacing where the image is relatively static, and employing one-field line doubling where the image is rapidly changing. The combination of these techniques provides a low-artifact, high-resolution deinterlaced image.

Figure 16:
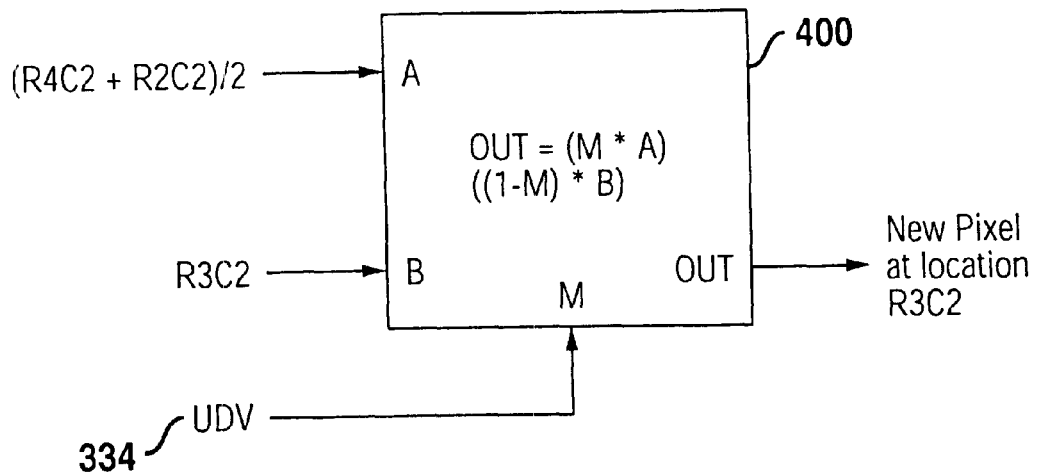
FIG. 16 is a block diagram of a mixing circuit in accordance with one embodiment of the present invention.

The UDV 334 is preferably used then in a mixing circuit 400 shown in FIG. 16. The mixing circuit 400 computes a new value for the pixel at location R3C2 of array 318. If no motion artifacts are detected, then the value of the UDV 334 will be "0" and the mixing circuit 400 will output the original pixel R3C2. If the value of the UDV 334 is "1," then the mixing circuit 400 will output the average of the pixels above and below R3C2, so the output of the mixing circuit 400 is the average of R2C2 and R4C2.

Figure 17:
FIG. 17 is a diagram of an exemplary operation of the mixing circuit in accordance with one embodiment of the present invention when the DV is greater than "0," but less than "1."

FIG. 17 is a diagram of an exemplary operation of the mixing circuit 400 when the UDV 334 is greater than "0," but less than "1." The mixing circuit 400 uses information from the three-pixel array 402 by blending R3C2, and the average of R2C2 and R4C2 to form a new output pixel 406 at location R3C2.

Figure 18:
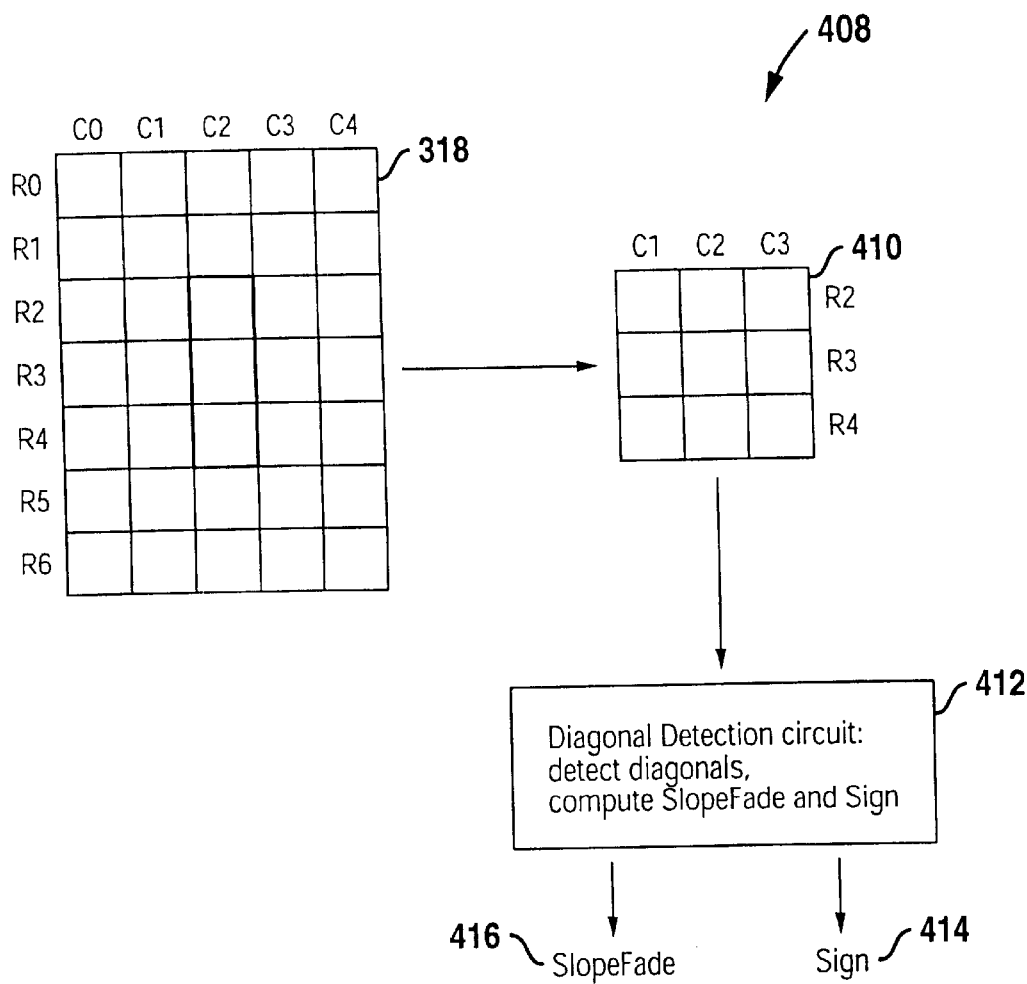
FIG. 18 is an illustration of a method for detecting diagonal features in accordance with one embodiment of the present invention.
Figure 21:
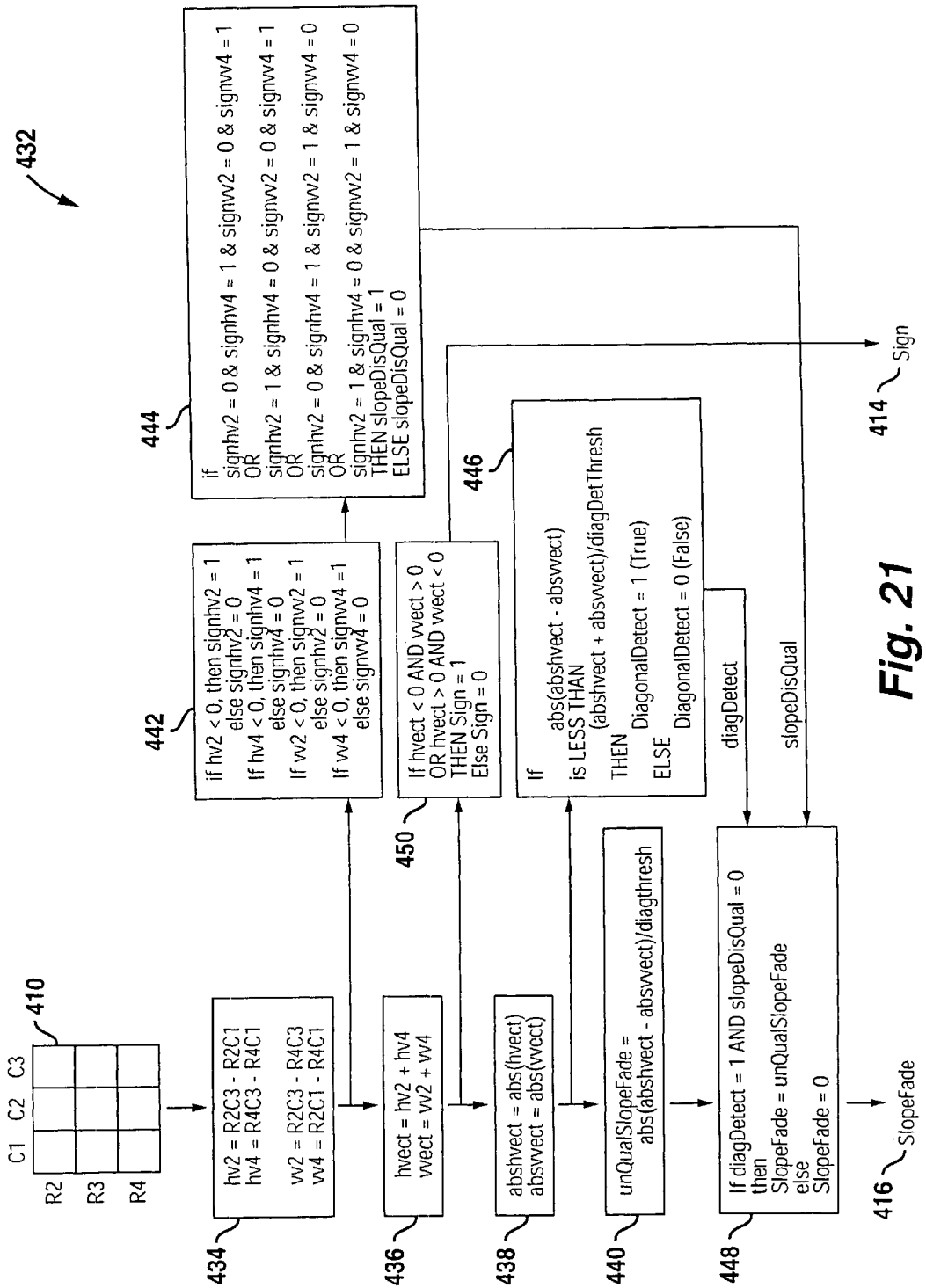
FIG. 21 is a flow chart of a diagonal detection method in accordance with one embodiment of the present invention.

FIG. 18 is an illustration of a method 408 for detecting diagonal features. A secondary array 410 that is a subset of array 318 is input into a diagonal detection circuit 412 which operates in parallel to the method 326 of FIG. 13. If no diagonal feature is detected, then the diagonal detection circuit 412 produces no output. However, if a diagonal feature is detected, the diagonal detection circuit 412 produces two outputs: a single bit Sign signal 414 and a multiple bit SlopeFade signal 416. The specific method for calculating the Sign and SlopeFade signals 414 and 416 is shown in FIG. 21 and its corresponding description.

The Sign signal 414 is used to determine which pair of pixels is diagonally adjacent to R3C2. The SlopeFade signal 416 is a measurement of the magnitude of a diagonal feature. Magnitude is determined by the amount of contrast along the diagonal feature. High contrast, such as a diagonal white line across a black background, will result in the highest values of the SlopeFade signal 416. A lower contrast results in a lower value for the SlopeFade signal 416.

Figure 19:
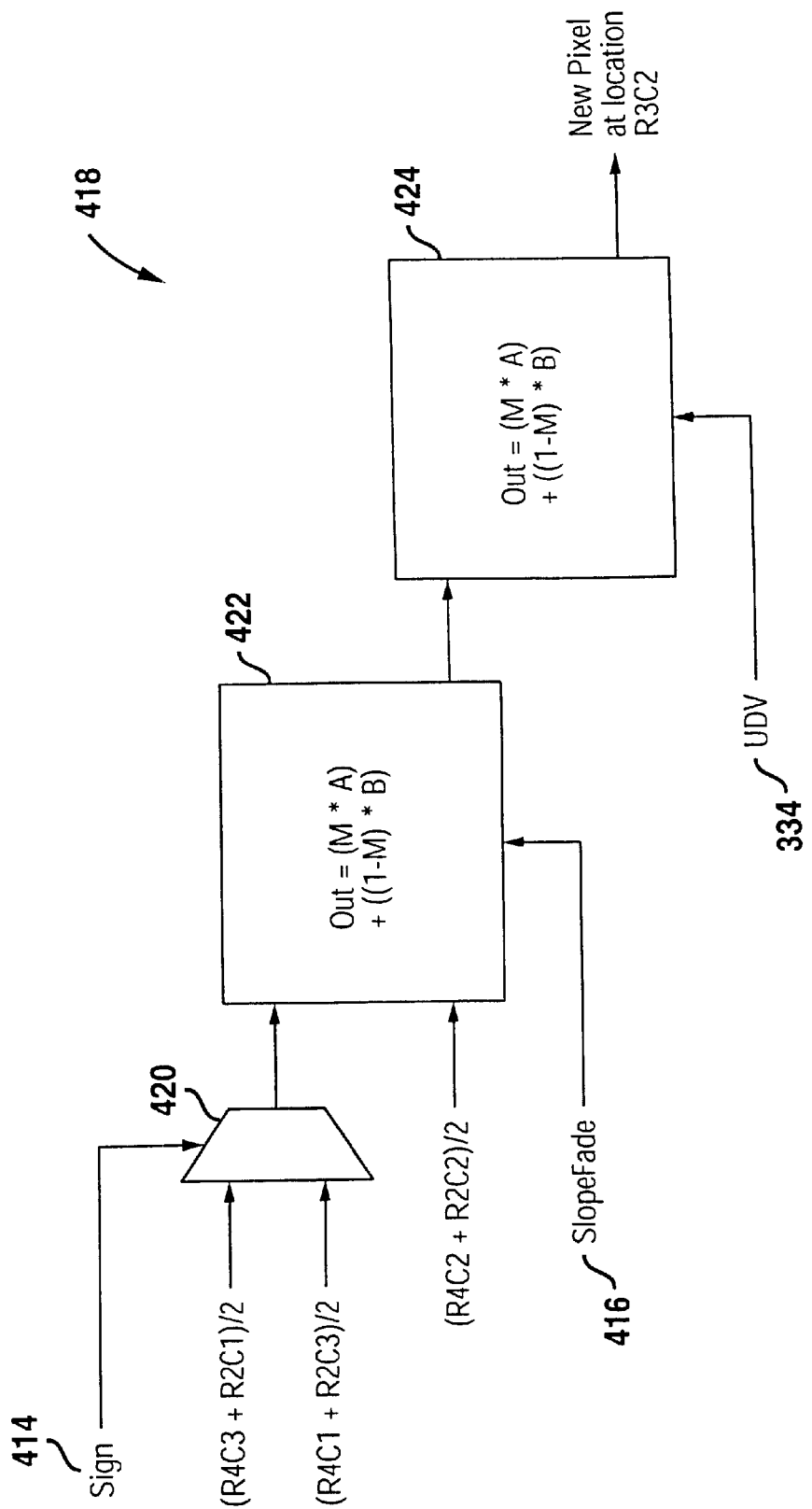
FIG. 19 is a block diagram of a diagonal mixing circuit in accordance with one embodiment of the present invention.

FIG. 19 is a block diagram of a diagonal mixing circuit 418 in accordance with one embodiment of the present invention. The diagonal mixing circuit 418 includes a multiplexer 420, a first mixer 422, and a second mixer 424. The multiplexer 420 relies on the Sign signal 414 to determine which pair of diagonally adjacent pixels are used. After a pair of diagonally adjacent pixels is chosen, the first mixer 422 blends the pixel values that are vertically adjacent to R3C2 with those that are diagonally adjacent to R3C2. The amount of blending is determined by the SlopeFade signal 416, which is proportional to the magnitude of the diagonal feature that is detected.

The second mixer 424 is the final mixing stage and is identical to the mixing circuit 400 shown in FIG. 16. The second mixer 424 produces an output that is determined by input pixel R3C2 and the output of the first mixer 422. The UDV 334 is the control input for second mixer 424. In summary, the new pixel value at R3C2 is computed from pixel values from the secondary array 410. The control signals for determining the final pixel value are the UDV 334, the Sign signal 414 and the SlopeFade signal 416.

Figure 20:
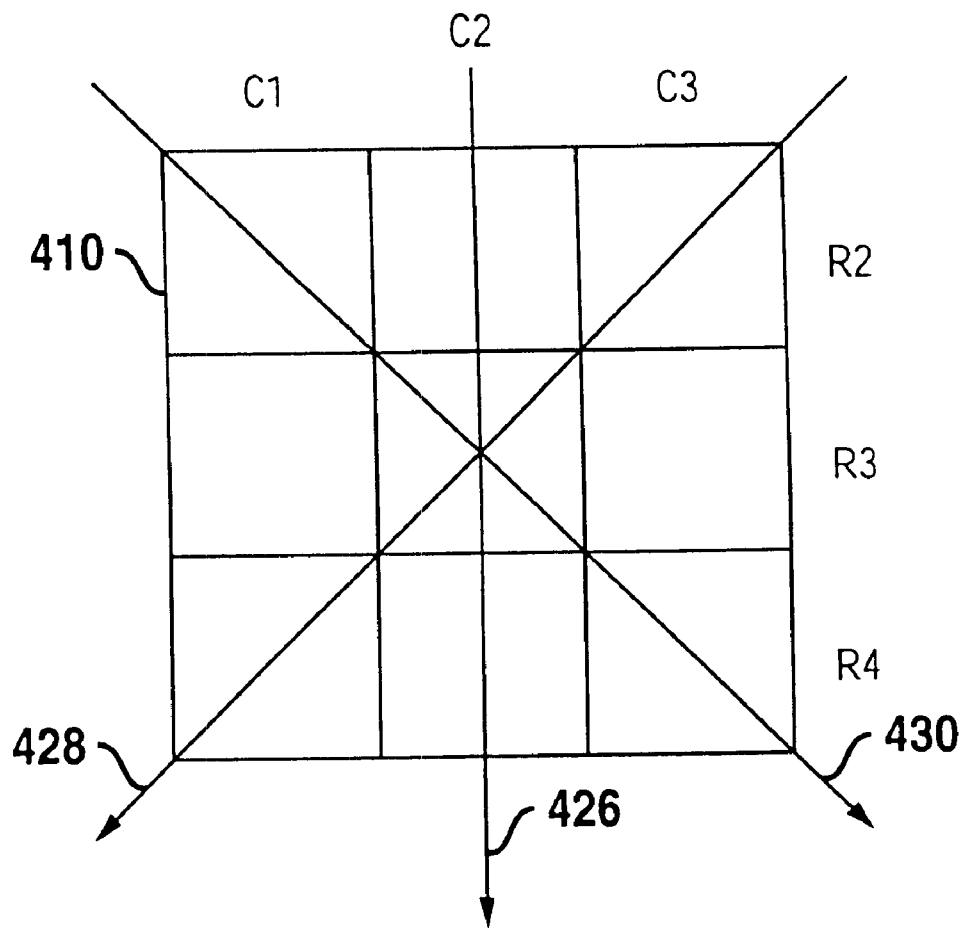
FIG. 20 is a diagram showing the pixels of secondary array used for calculating the output of the diagonal mixing circuit of FIG. 16.

FIG. 20 is a diagram showing the pixels of secondary array 410 used for calculating the output of the diagonal mixing circuit 418. If no diagonal features are detected within the secondary array 410, then the output of the mixing circuit is determined from the pixels along a line 426. If a diagonal feature is detected in diagonal detection circuit 412, the pixels that are diagonally adjacent to R3C2 along a line 428 or a line 430 are used to calculate the output pixel. The Sign signal 414 is used to determine which line 428 or 430 is used.

FIG. 21 is a flow chart of a diagonal detection method 432 in accordance with one embodiment in accordance with one embodiment of the present invention. The method 432 shows the flow of logical and mathematical operations used to compute the SlopeFade signal 416 and the Sign signal 414 from the secondary array 410. The corner pixels are divided into two horizontal pairs and two vertical pairs by an operation 434. The horizontal pairs are labeled hv2 and hv4 and the two vertical pairs are labeled vv2 and vv4. Differences are computed for each pair of corner pixel values by subtraction, producing a pair of horizontal differences and a pair of vertical differences.

In an operation 436, the two horizontal and vertical differences are summed to produce a horizontal and vertical difference vector for the secondary array 410. An operation 438 computes the absolute value of the horizontal and vertical difference vectors. A thresholding value is used to adjust the magnitude of the SlopeFade output 416 in an operation 440. The output of operation 440 is an unqualified SlopeFade signal (unQualSlopeFade) that is still subject to being "zeroed out" by the DiagDetect signal and the SlopeDisQual signal produced by parallel operations of the method 432.

The signs of the horizontal and vertical differences from operation 434 are recorded and stored in an operation 442. The signs indicate whether the operation 434 resulted in positive or negative numbers. Then, an operation 444 looks for cases where the signs of the horizontal and vertical difference operations are in opposition to each other. If such cases are found, then SlopeDisQual is set to "1." If the signs of the difference operations are not in opposition, then SlopeDisQual is "0."

In operation 444, the diagonal detector looks for diagonal features that are relatively large; in particular, the feature must be larger than the nine-pixel secondary array 410 used as the input to the diagonal processor. Image features that are smaller than the secondary array 410 can cause the diagonal processing to incorrectly detect a diagonal feature. These small features can be detected by observing the signs and setting SlopeDisQual accordingly.

An operation 446 compares the magnitude of the horizontal and vertical vectors computed in operation 438 to detect a diagonal feature. Then, the DiagDetect signal is produced in an operation 446 using the horizontal and vertical vectors. The ratio of the difference of the horizontal and vertical vectors and the sum of the horizontal and vertical vectors is adjusted by a threshold value, diagDetThresh.

A final SlopeFade output is computed in an operation 448 in which two single bit inputs are used to qualify the SlopeFade output. The first bit is a DiagonalDetect bit and the second bit is a SlopeDisQual bit. SlopeFade will be zero if DiagDetect is 0 or if SlopeDisQual is a 1, otherwise, SlopeFade will take the value of unQualSlopeFade. The SlopeDisQual signal changes the SlopeFade signal to zero for cases where the slope of the diagonal feature cannot be reliably calculated.

Finally, the Sign signal 414 is computed in an operation 450 using the sign bits produced by the sums of the horizontal and vertical vectors performed in operation 436. The Sign signal 414 is computed using this logical operation to determine the slope of the diagonal feature.

Figure 22:
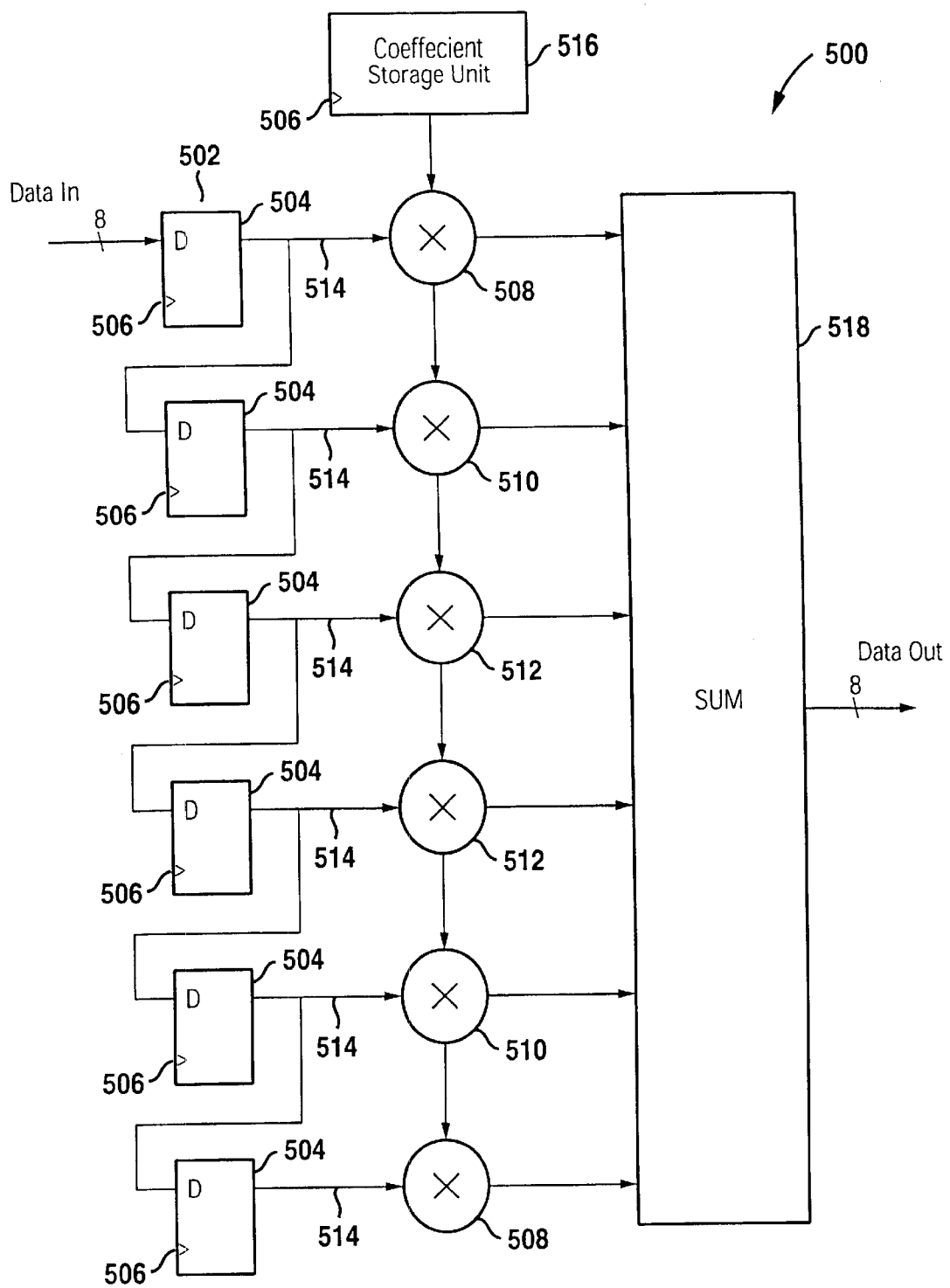
FIG. 22 is an example of a variable scaling FIR filter in accordance with one embodiment of the present invention.

The video output processor 60 of FIG. 4 is discussed in greater detail with reference to FIGS. 22–27. FIG. 22 shows an example of a variable scaling FIR filter 500. The variable scaling FIR filter 500 includes a shift register 502 with a series of registers 504 each of which is connected to a clock 506. Each register 504 is connected to one of a set of multipliers 508, 510, and 512 by one of a series of filter taps 514. Multipliers 508, 510, and 512 accept two inputs to be multiplied. The first input is an eight-bit data word, and the second input is a coefficient. Multipliers 508, 510, and 512 differ from each other in that they accept coefficients quantized to different numbers of bits. Multipliers 508 use the least number of bits per coefficient and multipliers 512 use the most bits per coefficient. Multipliers 508, 510, and 512 are connected to a coefficient storage unit 516 and an adder 518.

Eight bits of data are input into the variable scaling FIR filter 500 through the shift register 502. The output of each register 504 is coupled by one of a series of filter taps 514 to one of a set of multipliers 508, 510, and 512 to be multiplied by a coefficient produced by the coefficient storage unit 516. A new set of coefficients is entered into the multipliers 508, 510, and 512 by the coefficient storage unit 516 on each cycle of clock 506. The results from each multiplier 508, 510, and 512 are summed by the adder 518 to produce a filtered output sample.

Figures 23, 24:
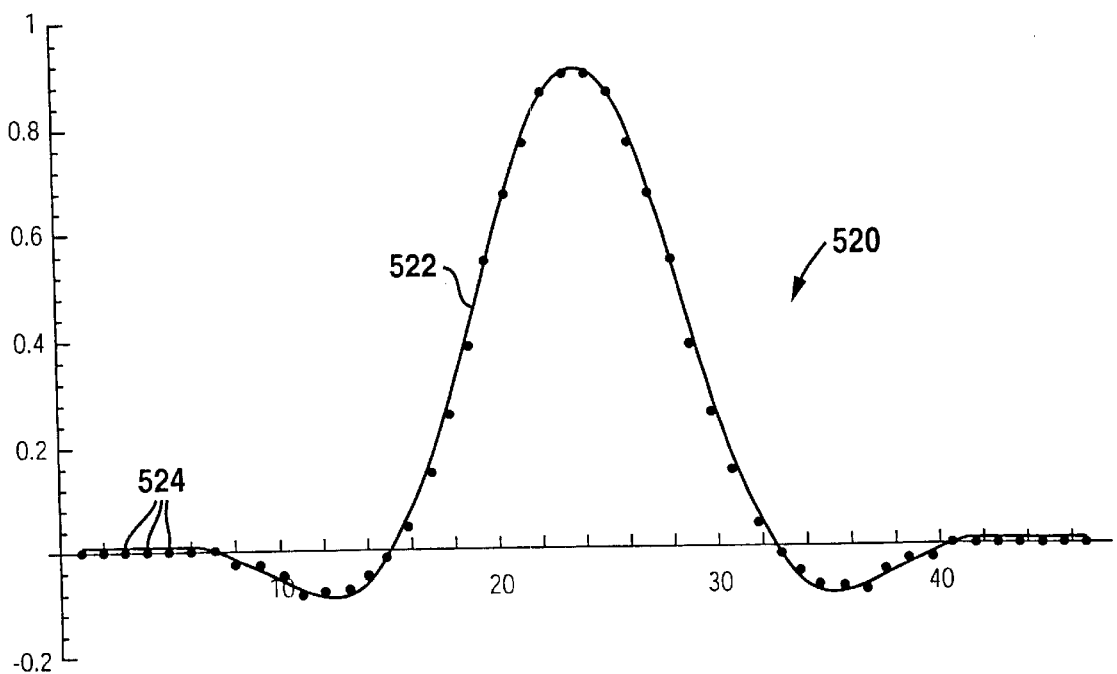
FIG. 23 is a graph of low-pass filter coefficients in the time domain.
FIG. 24 is a table of coefficients organized into L sets of mults per set.

FIG. 23 is a graph of low-pass filter coefficients 520 in the time domain stored in the coefficient storage unit 516 to produce coefficients. The low-pass filter coefficients 520 are represented by the equation below.

$$\sum_{i=1}^{m} c(i) = \frac{2Lfc}{2fc\pi(i-1/2)} * \sin[2fc\pi(i-1/2)] * \{0.54 + 0.46\cos[2\pi(i-1/2)/taps]\} \quad (1)$$

The unquantized and continuous wave is represented by a curve 522. Filter coefficients 524 are shown plotted on or near the curve 522. Some coefficients 524 appear slightly off the curve due to the error introduced by quantizing each coefficient to a limited number of bits.

FIG. 24 shows the coefficients 524 organized into L=8 sets of mults=6 coefficients per set. The sum of all the coefficients in each set i where i=1 to L is represented by the equation below.

$$s(i) = \sum_{j=1}^{j=mults} c(L(j-1)+i) \quad (2)$$

Figure 25:
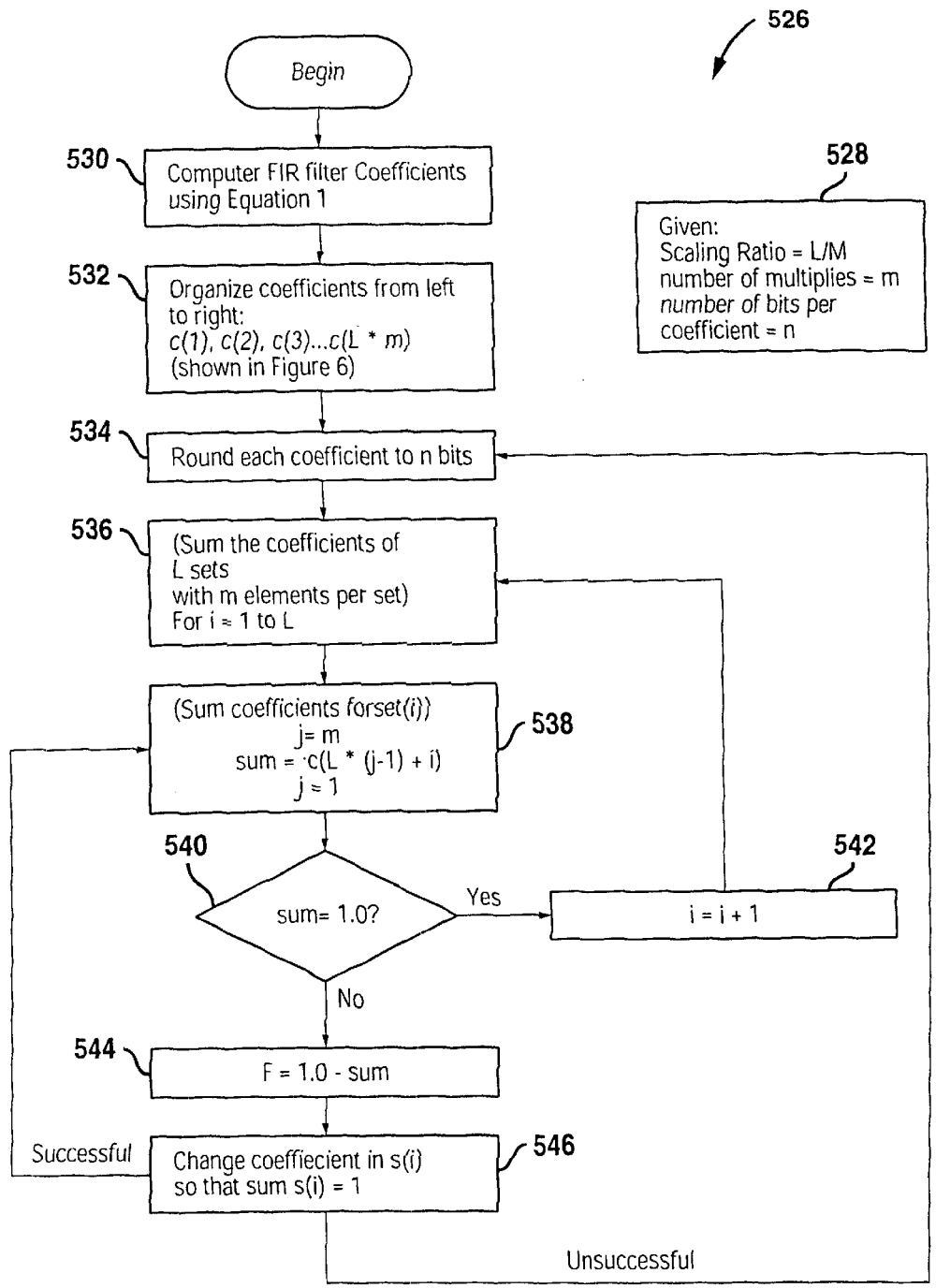
FIG. 25 is a flow chart of a method for quantization in accordance with one embodiment of the present invention.

FIG. 25 is a flow chart of a quantization method 526 in accordance with one embodiment of the present invention. The method 526 initializes with a given set of parameters 528 needed to compute the coefficients where L is the numerator of the scaling ratio L/M; mults is the number of multipliers used in the FIR filter; and n is the number of bits to which the coefficients will be quantized. An operation 530 computes the FIR filter coefficients using equation 1. In an operation 532, the coefficients are organized from left to right and labeled c(1), c(2), c(3), . . . c(L.*mults).

In an operation 534, each coefficient is quantized to n number of bits by rounding. Next, an operation 536 starts a loop which is executed L times, one time for each coefficient set, in which all the coefficients in each set are summed. An operation 538 sums the coefficients for set(i) represented in FIG. 24. Then, an operation 540 tests the result of the summing operation 538 for a 1.0 result. If operation 540 produces a true result, then no further processing is done.

The loop iterator is incremented in an operation 542, and control passes back to operation 536. If operation 540 produces a false result, then a Fudge value F is computed in an operation 544 by subtracting the sum produced in operation 538 from 1.0. Then, processing proceeds to an operation 546 in which one of the coefficients of set(i) is changed so that the sum of all the coefficients in set(i)=1.0.

Figure 26:
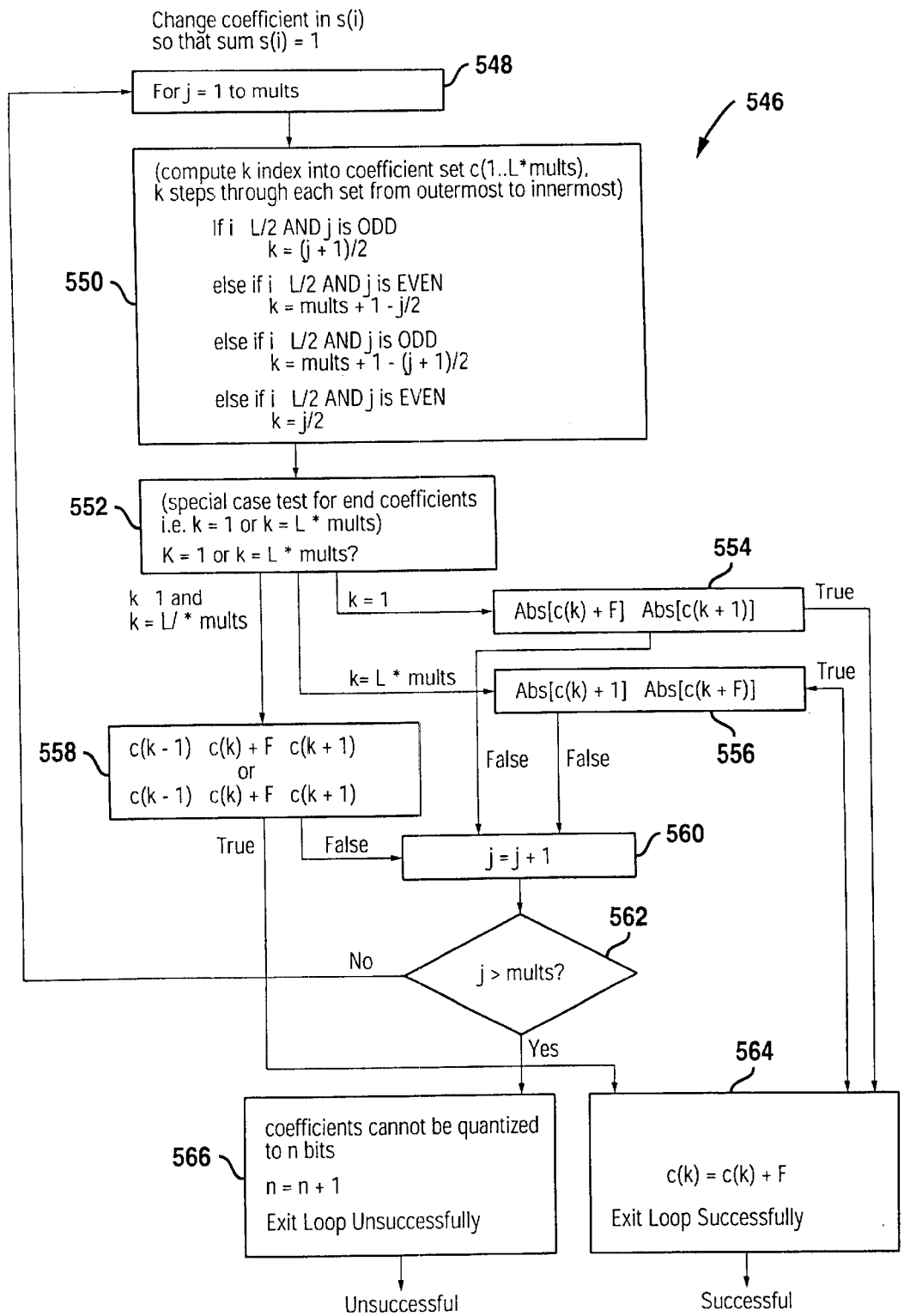
FIG. 26 is a flow chart of a method for changing coefficients in accordance with one embodiment of the present invention.

FIG. 26 is a flow chart of the operation 546 from FIG. 25 in much greater detail. An operation 548 is a loop set up to step through the coefficients of set(i) in a particular order. The order starts with the outermost coefficient of the set(i), and then moves toward the center of the set. Operation 548 is executed mults times, because there are mults number of coefficients per set. Next, an index k is computed in an operation 550, which is used to process the coefficients in the previously stated order.

The coefficients at the left or right edge of the coefficient set must be handled as a special case. Therefore, an operation 552 is performed on the index k to determine whether the coefficient to be processed is either the first coefficient, c(1), or the last coefficient, c(L*mults). If operation 552 determines that the coefficient to be adjusted is the leftmost one, that is, c(1), then an operation 554 is performed.

Operation 554 evaluates whether the absolute value of the sum of c(1) and F is less than or equal to the absolute value of the coefficient to the right of c(1). This means that c(k+1)≦c(2). If the result is true, then c(1) can be adjusted by adding F without creating a discontinuity or divergence from the zero axis. The coefficient is adjusted in an operation 564, and operation 546 is exited successfully. If the result is false, then operation 560 performs a loop iteration.

If operation 552 determines that the coefficient to be adjusted is the rightmost one, that is, c(L*mults), then the method proceeds to an operation 556. Operation 556 evaluates whether the absolute value of the sum of c(L*mults) and F is less than or equal to the absolute value of the coefficient to the left of c(L*mults), that is, c(L*mults−1). If the result is true, then c(L*mults) can be adjusted by adding F without creating a discontinuity or divergence from the zero axis. The coefficient is adjusted in 564, and operation 546 is exited successfully. If the operation 556 result is false, then a loop iteration is performed in operation 560.

If operation 552 determines that the coefficient to be adjusted is neither the leftmost or rightmost one, then an operation 558 is performed. Operation 558 evaluates whether the sum of c(k) and F is outside the limits of the coefficients on the left and right, that is c(k−1) and c(k+1), by evaluating the equations c(k−1)≦c(k)≦c(k+1) and c(k−1)≧c(k)≧c(k+1). If either of the equations is true, then the coefficient c(k) is set equal to c(k)+F in operation 564 and a discontinuity is not introduced. Therefore, operation 546 is successfully exited. If either of the equations is false, then a loop iteration is performed in operation 560.

Operation 560 increments the loop iterator variable so the next coefficient can be evaluated. An operation 562 asks whether all the coefficients in the set(i) have been evaluated. If all the coefficients in set(i) have not been evaluated, then control is passed to the top of the operation 548 and the procedure is repeated for the next coefficient. If all the coefficients in set(i) have been evaluated, then the coefficient set cannot be quantized to n bits without introducing an unacceptable discontinuity into the coefficient set. Therefore, n is incremented in an operation 566 and operation 546 is exited. Control is then returned to the method 526 at operation 534 (in FIG. 25) where the original coefficients are quantized to the new value of n and the process is repeated. In the cases where operation 546 is successfully exited, control is returned to the method 526 (in FIG. 25) at the operation 538 and the next coefficient set(i) is evaluated.

Figure 27:
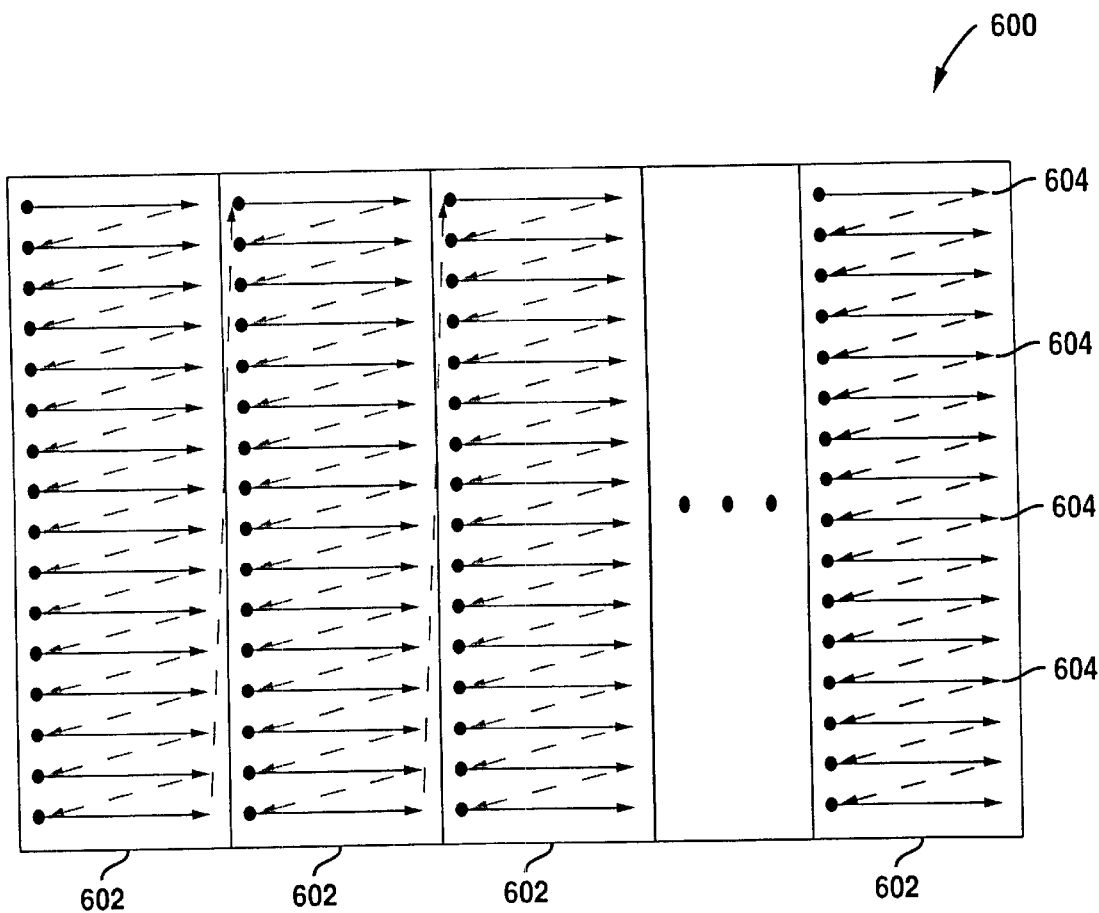
FIG. 27 illustrates a video frame in accordance with one embodiment of the present invention which is subdivided into a number of vertical slices for a slice scanning sequence exemplified by a corresponding number of scan lines.

The two-dimensional chip architecture 50 and the addressing and sequencing FIFOs 90 of FIG. 4 are discussed in greater detail with reference to FIGS. 27–33. FIG. 27 illustrates a video frame 600 in accordance with one embodiment of the present invention subdivided into a number of vertical slices 602 for a slice scanning sequence exemplified by a corresponding number of scan lines 604. Each slice 602 is scanned in a format similar to that used in a conventional raster-scanned sequence, with the scanning sequence proceeding to the subsequent slice when the end of a given slice is reached. The advantage of this format is that the length of the line memories is reduced by a factor roughly equal to the number of vertical slices used. Line memories are still necessary, but they are now much shorter than before, resulting in a much reduced on-chip memory requirement. For instance, if the number of slices were set to 10, the reduction in on-chip memory would be by an entire order of magnitude.

However, difficulties do arise from utilizing this "slice" scan organization. First, it is often the case that processing must simultaneously be done in both the horizontal and vertical directions. This results in a problem on the left and right slice boundaries where horizontal pixel data outside the slice may not be available. Second, the conventional raster-scan sequencing has been changed, resulting in a potential incompatibility with common video sources and display/storage devices. Both of these problems will be addressed in the following discussion as solved by the present invention.

Figure 28:
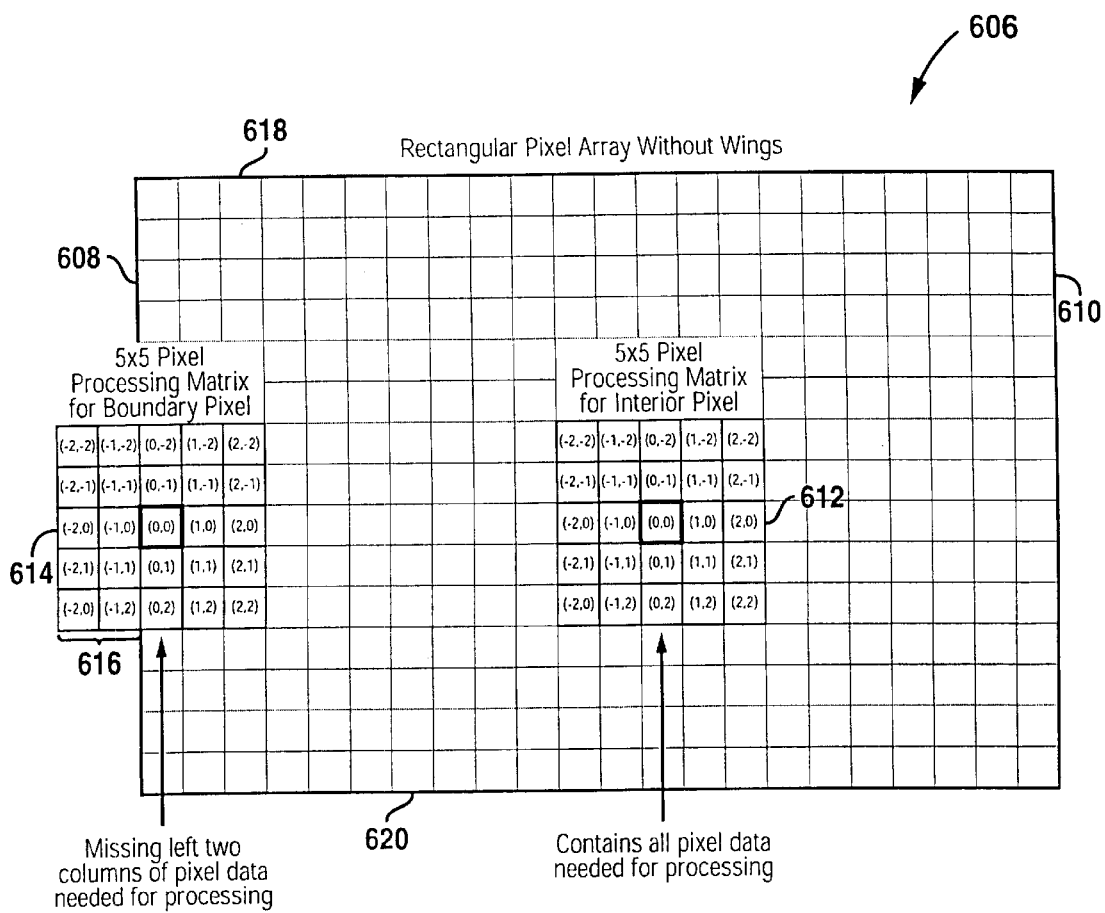
FIG. 28 illustrates an example of an initial slice core that has a problem with unavailable data on its left edge and right edge.

FIG. 28 illustrates an example of a slice core 606 that has a problem with unavailable data on its left edge 608 and right edge 610. For purposes of illustration, unavailable data is shown only on the left edge in FIG. 28. Video processing requires that data surrounding a given pixel be available in both the horizontal and vertical directions (in this case 5×5 matrices 612 and 614 centered on the pixel).

Processing matrix 612 resides in the center of the slice core 606, so there is no problem with availability of data because it is available in both horizontal and vertical directions on all sides of processing matrix 612. The situation at the top edge 618 and bottom edge 620 of the slice core 606, where data above the top-most pixel and data below the bottom-most pixel is not available, is identical to that with the conventional raster-scanned format. This can be solved in a number of ways, such as substituting zero data for the nonexistent upper/lower pixel data. Therefore, the top and bottom edges 618 and 620 of the slice core 606 will not cause problems with unavailable data.

In contrast, processing matrix 614 is on the left edge 608 of the slice core 606, horizontally adjacent data. Thus, two columns of pixel data 616 are missing because they are outside the left edge 608 of the slice core 606. To resolve this situation, data for these columns are provided from the slice immediately to the left of the slice being processed.

Figure 29:
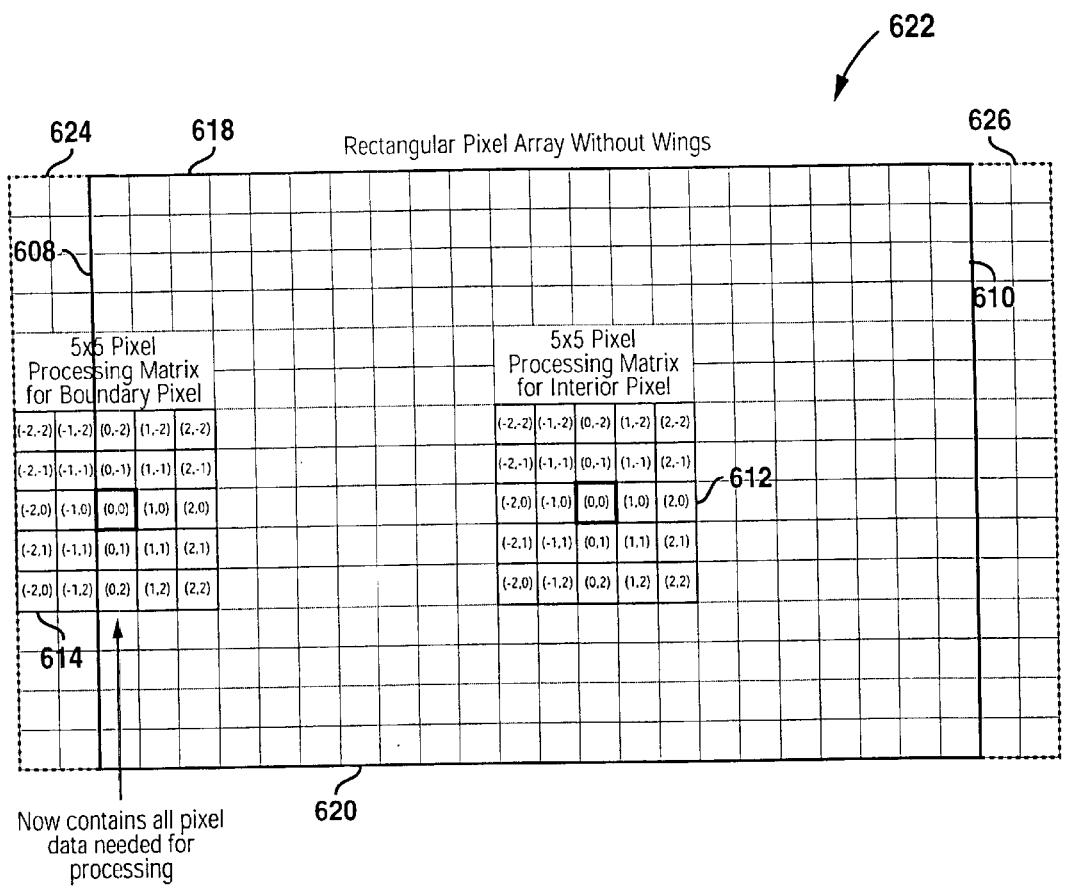
FIG. 29 illustrates a slice that has added wings along the initial slice core's left and right edges.

FIG. 29 illustrates a slice 622 that includes a pair of thin vertical slices or "wings" 624 and 626 along the left and right edges 608 and 610. Wing 624 has been added to the slice core 606 to provide the pixel data needed for the processing matrix. Wing 626 has been added to the right edge 610 of the slice core 606. Because wing 624 has been added to slice 622, processing matrix 614 no longer suffers from the lack of data outside of the left edge 608 of slice 622.

Figure 30:
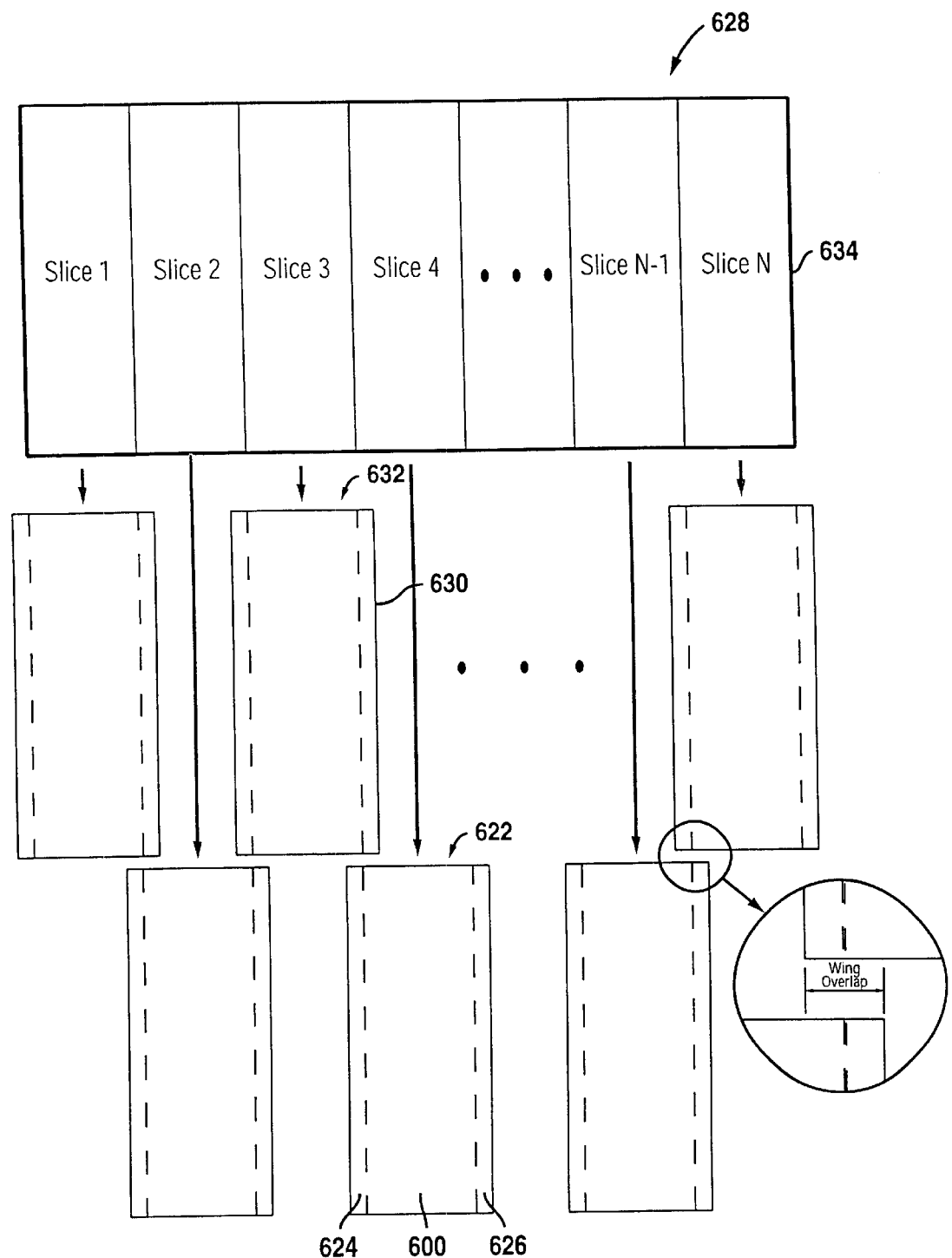
FIG. 30 illustrates an overall structure of overlapping slice/wing combinations.

FIG. 30 illustrates an overall structure of overlapping slice/wing combinations 628. Slice 622 from FIG. 29 is shown as an exemplary slice. Wings 624 and 626 of slice 622 are composed of data from a pair of adjacent slices, one to the left and one to the right of slice 622. More specifically, the missing two left columns of pixels in wing 624 are supplied from the two right most columns 630 of a slice 632 immediately to the left of slice 622. So in a sequence of slices 634, the left-most wing of slice N overlaps the core of slice N−1, while the right-most wing of slice N−1 overlaps the core of slice N.

Figure 31:
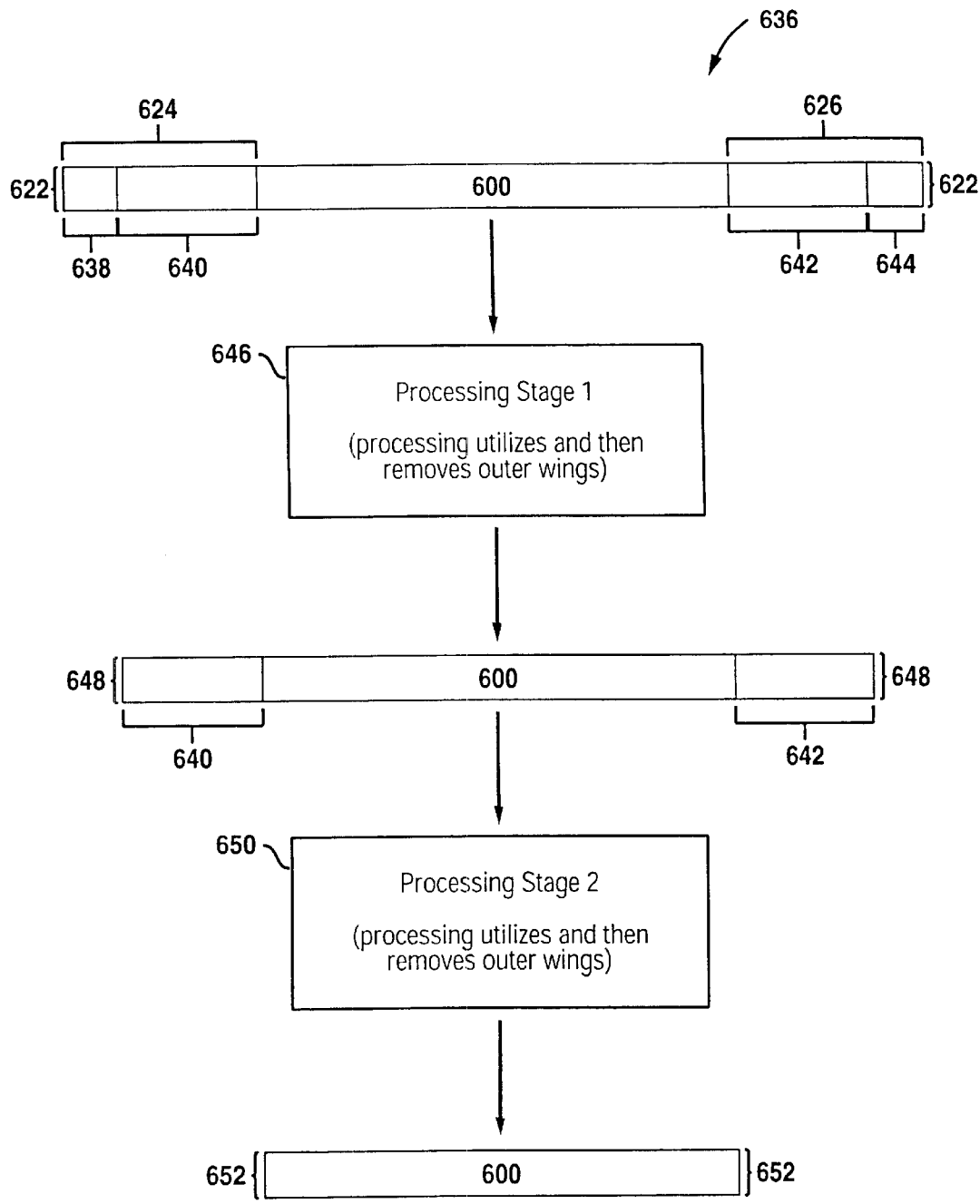
FIG. 31 is a flow chart illustrating a method of processing video in accordance with one embodiment of the present invention.

FIG. 31 is a flow chart illustrating a method 636 of processing video in accordance with one embodiment of the present invention. The input to a video processing block is therefore the slice 622 with slice core 606, left wing 624 and right wing 626. The left wing 624 is divided into a left outer wing 638 and a left inner wing 640. The right wing 626 is divided into a right outer wing 644 and a right inner wing 642. In this example, the video processing block has multiple processing stages, each with its own requirement for horizontal pixels on each side of the center.

The method 636 utilizes a first processing stage 646 and a second processing stage 650. The first processing stage 646 utilizes and then removes the outer wings 638 and 644 leaving an output slice 648 consisting of the slice core 606 and the inner wings 640 and 642. The second processing stage 650 utilizes and then removes the inner wings 640 and 642. Therefore, the wings 624 and 626 are effectively removed in the processing and the output of the processing block is a slice 652 with the width equal to the original slice core 606.

One effect of the wings 624 and 626, is to increase the on-chip slice-line memory requirements by the width of the wings 624 and 626. However, the wing width is typically small relative to the overall slice width. The actual slice and wing width is implementation dependent and will depend on processing requirements and available external memory bandwidth.

A preferred embodiment of the present invention utilizes three vertical video processing blocks. The first processing stage 646 requires a pair of outer wings 638 and 644 having a width of 2 pixels; the second processing stage 650 requires a pair of inner wings 640 and 642 with a width of 4 pixels; and the third processing stage 652 requires no wings as the specific processing algorithm used does not require data horizontal to the vertical data being processed. The slice core width chosen was 36 pixels, resulting in an initial input slice width of 48 pixels. (Core+left-inner-wing+right-inter-wing+left-outer-wing+right-outer-wing=36+4+4+2+2=48.)

Unfortunately, the data inputs and outputs of the vertical processing blocks are not in the raster-scan video format, which is standard to virtually all video input sources and video output display and storage devices. The present invention includes a standardized input/output format conversion, which is accomplished via the use of a memory external to the video processing device. A commodity DRAM memory device is used for reasons of cost and availability.

Depending on the type of video processing to be done, a field or frame size buffer(s) serves other necessary purposes in addition to conversion between full field/frame raster-scan and slice-scan formats. For instance, the deinterlacing process typically requires one (sometimes several) field buffers to store multiple fields of video data for temporal processing. Buffers are also needed in frame rate conversion, where the output frame rate is different than the input rate; in this case multiple output field or frame buffers may be required for the frame rate conversion process.

Figure 32:
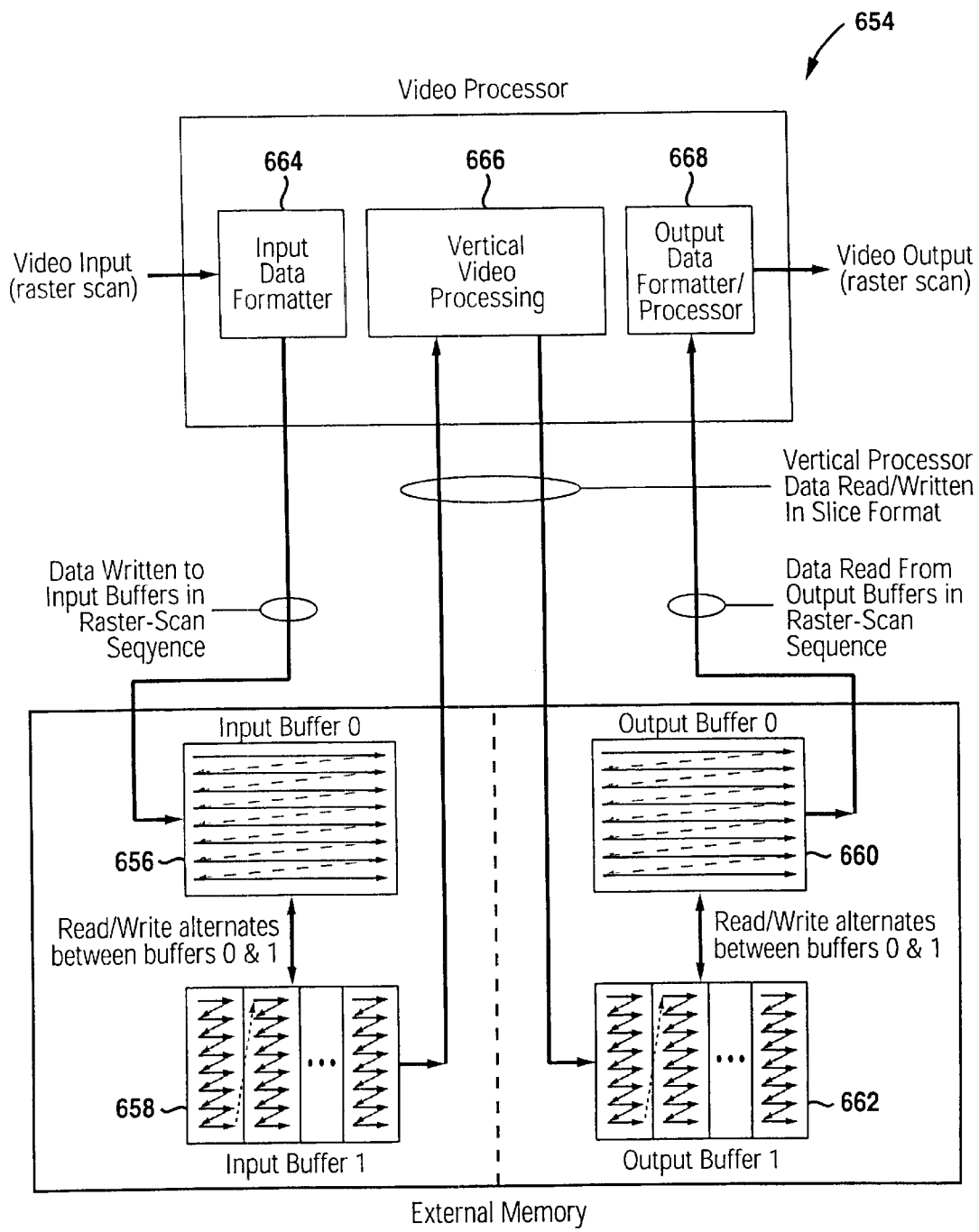
FIG. 32 illustrates a system diagram for a slice based video processor in accordance with one embodiment of the present invention.

FIG. 32 illustrates an example of a system diagram for a slice-based video processor 654. A first input buffer 656, a second input buffer 658, a first output buffer 660, and a second output buffer 662 are required for the slice conversion process. Because video applications typically require real-time input and output, and because the scanning process for a conventional raster-scan and a slice-scan are different, the first input buffer 656 is used to store the video input data stream from the input data formatter 664. The second input buffer 658 (filled in the previous field/frame period) is used to provide data to the vertical video processing section 666 in a slice-scan format.

A similar process is used for output. The second output buffer 662 receives processed data in slice-scan format from the vertical video processing section 666, while the first output buffer 660 (filled in the previous field/frame period) is used to output data in the conventional raster-scan format to the Output data formatter 668. The output data stream may actually provide data to additional video processing stages that process data in the horizontal direction only (e.g. horizontal scaling and color space conversion).

Figure 33:
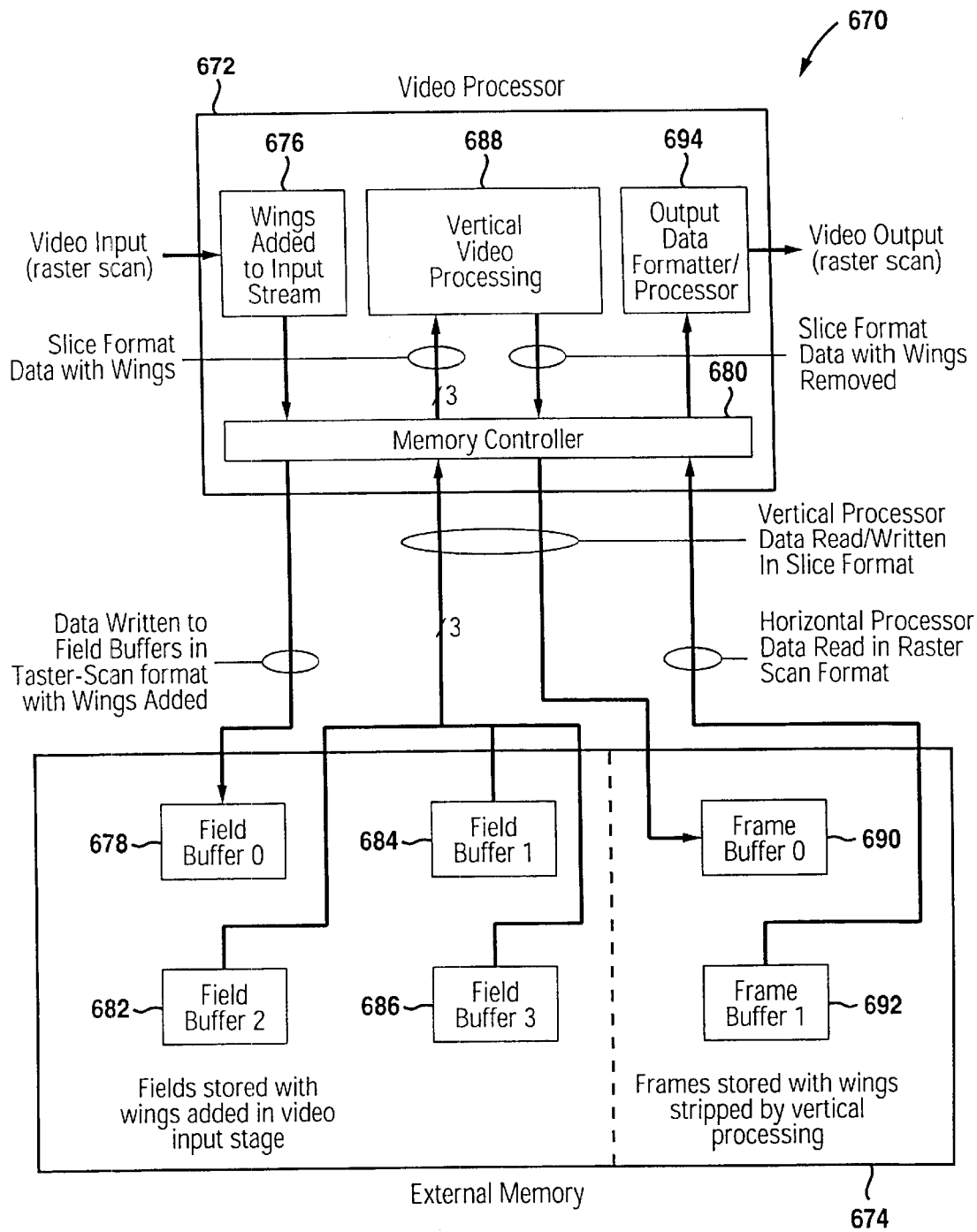
FIG. 33 illustrates a system diagram of a video processing chip architecture in accordance with one embodiment of the present invention.

FIG. 33 illustrates a system diagram of one example of a video processing chip architecture 670. The video processing chip architecture 670 includes a video processor 672 and an external memory source 674. In this particular video processing implementation, multiple input field storage (for temporal processing) is required. Video data is provided to an input stage 676 in the video processor 672 that adds the redundant wing data directly into the video data stream. The data is then written (wings included) in a raster-scan sequence to a first field memory buffer 678 in the external memory source 674 by the memory controller 680 which is located inside the video processor 672.

In subsequent field periods, data is written to a second field memory buffer 682, a third field memory buffer 684, and a fourth 686 field memory buffer in sequence. Next, data is read from the second, third and fourth field memory buffers 682, 684, and 686, all of which are in the external memory source 674 and connected in parallel. The field buffers 682, 684, and 686 feed the vertical video processing section 688 that is located inside the video processor 672. The data is processed in the vertical video processing section 688, which removes the wings.

Data is written from the vertical video processing section 688 in a slice-scan format back to a first frame buffer area 690 in the external memory source 674. Data is read from a second frame buffer area 692 in the external memory source 674 in a conventional raster-scan sequence for input to a horizontal processing block 694 located in the video processor 672. The output of the horizontal processing block 694 is in raster-scan format and is the output of the video processor 672.

In one preferred embodiment of the present invention, video input data is provided as interlaced fields of data in a 720×240 pixel field format. Each video field is conceptually broken into 20 slices having a width 36 pixels, with each slice having left and right wings of 6 pixels each (outer wings of 2 pixels each and inner wings of 4 pixels each). The wings are added at the appropriate points in the video input data stream, and the resulting data stream is written in raster-scan sequence into a first field buffer in an external SDRAM.

Three fields of data are read from the SDRAM simultaneously. The data for these fields is sourced by second, third, and fourth field buffers and is read in vertical slices 48 pixels wide (slice core and wings) by 240 rows. The data is processed by a first vertical processing stage that provides slice-scan format data at twice the input rate of a single field to a second stage. Slice data input to the second stage is formatted in slices of 44 pixels wide by 480 rows (due to the rate-doubling action of the first stage). The second vertical processing stage processes the data and provides 36 pixel wide slice-scan format data at the same rate as the input to that stage to a third vertical processing stage.

The third stage is a vertical scaler and performs no horizontal processing, and so does not require wings on the slice format data. Data is output from the third processing stage in a 36 pixel wide slice-scan format to a first frame buffer area in the SDRAM. The number of rows in each slice is dependent on the specific vertical scaling ratio chosen. Data is input to a horizontal-only processing stage in conventional raster scan format of 720×480*M pixels, where M is the vertical scaling factor in the third vertical processing stage. This data is processed by the horizontal processor (which includes a horizontal scaler) and is output in a conventional raster-scan format at a resolution of 720*N× 480*N, where N is the horizontal scaling factor.

Overall, this implementation results in a greater than 10×reduction in on-chip memory requirements due to the slice-scan architecture. This expense saved with the reduction in on-chip memory requirements more than offsets the additional required external memory, and provides a variety of prototyping and production options.

Figure 34:
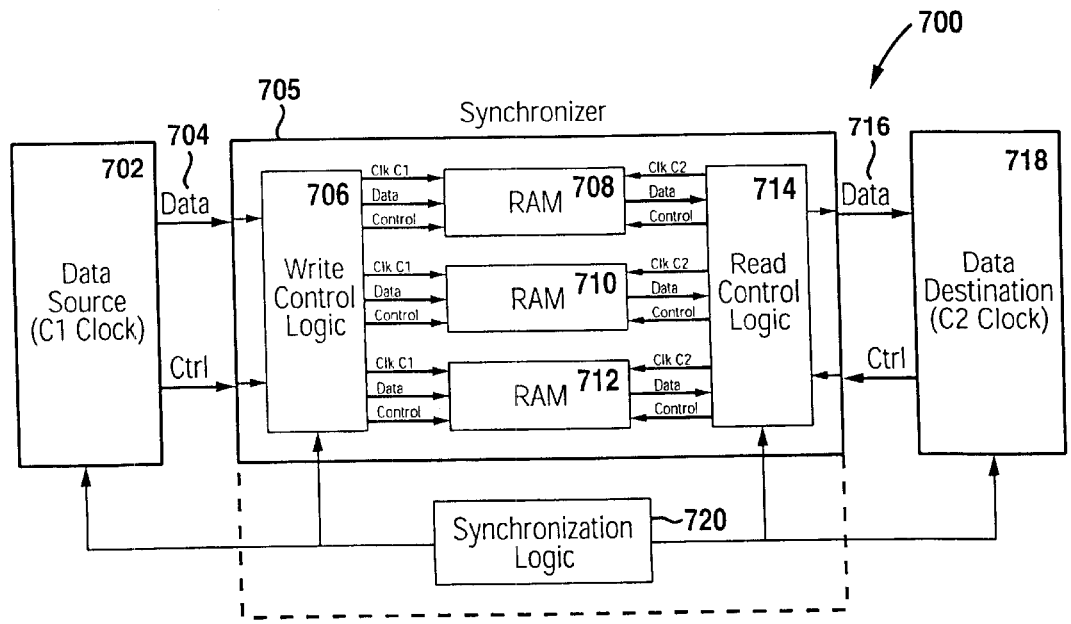
FIG. 34 is a diagram of an asynchronous interface in accordance with one embodiment of the present invention.

The video output processor 60 of FIG. 4 is discussed in greater detail with reference to FIGS. 34–38. FIG. 34 is a diagram of an asynchronous interface 700 in accordance with one embodiment of the present invention. A data source 702 provides data synchronous to clock C1 in an input data stream 704 to a synchronizer 705. Once the data has been received by the synchronizer 705, a write control logic (WCL) unit 706 directs the writing of this data into one of a first RAM buffer 708, a second RAM buffer 710, and a third RAM buffer 712 by providing control and address signals to each of the RAM buffers 708, 710, and 712.

Once data has been written into the RAM buffers 708, 710, and 712, a read control logic (RCL) unit 714 directs the reading of data from the RAM buffers 708, 710, and 712 by providing address and control signals to the RAM buffers 708, 710, and 712. The retrieved data is then output from the synchronizer 705 in a continuous output data stream 716 at clock rate C2 to a data destination 718.

Reading of data from a given RAM buffer 708, 710, or 712 does not start until that particular RAM buffer 708, 710, or 712 has been filled by the WCL unit 706. After one of the RAM buffers 708, 710, or 712 has been filled, the next RAM buffer 708, 710, or 712 is written to in sequence, and data can be read from the previously filled RAM buffer(s) 708, 710, and/or 712. Although this particular embodiment uses three RAM buffers it should be understood that more RAM buffers may be used depending on the system requirements.

A synchronization logic unit 720 external to the synchronizer 705 coordinates the reading and writing of data. Optionally, the synchronization logic 720 could be part of the synchronizer 705 itself. Multiple synchronization schemes may be implemented. For example, the synchronization logic 720 could signal the WCL unit 706 and the data source 702 when to start a data transfer. A predetermined period later, when the first RAM buffer 708 has been filled and the second RAM buffer 710 is in the process of being filled, the synchronization logic 720 instructs the RCL unit 714 to begin reading data from the first RAM buffer 708 and to provide it to the data destination 718.

An alternative scheme could have the data transfer be more or less free running. The WCL unit 706 would be accepting data from the data source 702 as it is available, writing that data to the next available RAM buffer 708, 710, or 712, and signaling the RCL unit 714 that the respective buffer is full. The "buffer full" signal must be synchronized from the C1 to C2 clock domain, typically through a dual-rank synchronizer. The RCL unit 714 could either latch the state of the "buffer full" signal, or return a handshaking signal (which must be synchronized from the C2 to C1 clock domains) back to the WCL unit 706 indicating that either the "buffer full" signal has been received or that the RAM buffer 708, 710, or 712 has been emptied.

Figure 35:
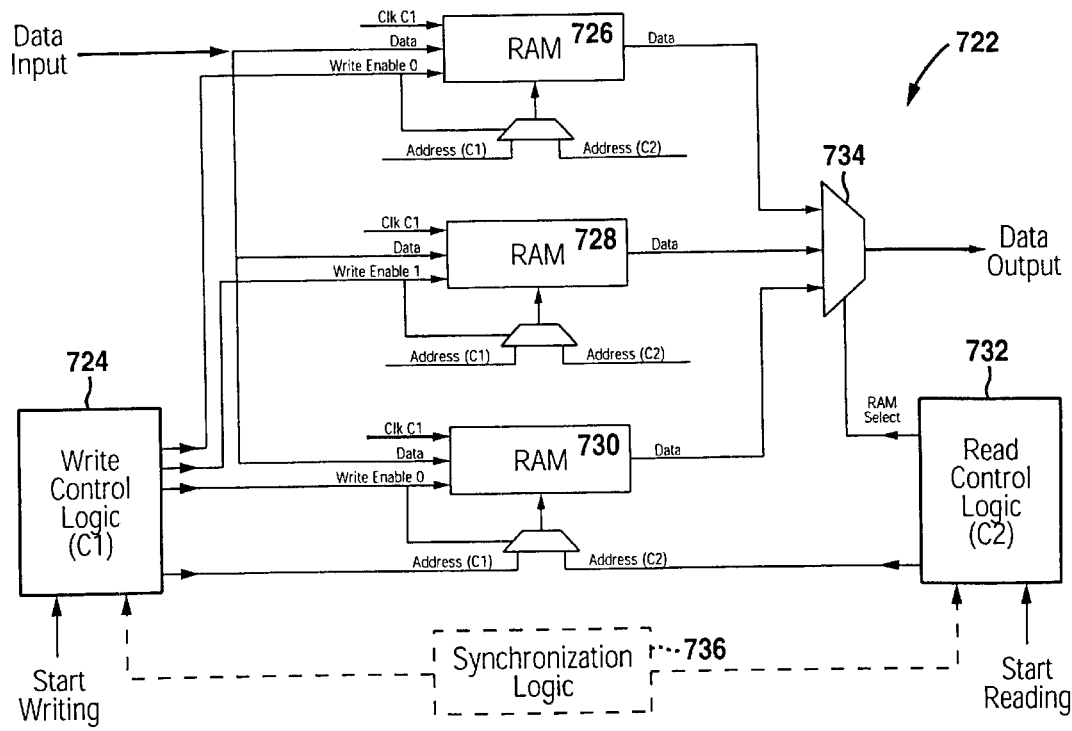
FIG. 35 is a diagram of an alternative asynchronous interface in accordance with one embodiment of the present invention.

FIG. 35 is a diagram of an alternative asynchronous interface 722. Data transfer is initiated via an external signal to the WCL unit 724 that indicates that a data transfer is to begin. The WCL 724, synchronous to clock C1, generates write enables and addresses for the a first single-ported RAM buffer 726, a second single-ported RAM buffer 728, and a third single-ported RAM buffer 730. The single-ported RAM buffers 726, 728, and 730 have synchronous write and asynchronous read capabilities.

Only a single write enable is active at any one time, with the write enable for RAM buffer 726 being asserted first, followed by that for RAM buffer 728, then RAM buffer 730, then back to RAM buffer 726, and so forth. At the point that RAM buffer 728 is full and RAM buffer 730 is approximately half full, an external signal is asserted to the RCL unit 732 to initiate reading of the data from the RAM buffers 726, 728, and 730. The RCL unit 732, synchronous to clock C2, generates addresses and data select lines for the RAM buffers 726, 728, and 730 for read operations.

Individual RAM buffers 726, 728, and 730 receive a read or write address based on which RAM buffer 726, 728, or 730 is currently being written to, i.e., one RAM buffer 726, 728, or 730 being written to receives its address from the WCL unit 724 while the other two RAM buffers 726, 728, and 730 receive their addresses from the RCL unit 732. A data MUX 734, controlled by the RCL unit 732, selects the output data stream from the one of the three RAMs currently being read from. Although in this example, external signals start the data transfer read and write operations, an optional synchronization logic unit 736 may be present in the absence of one or more of the external "start" signals.

Figure 36:
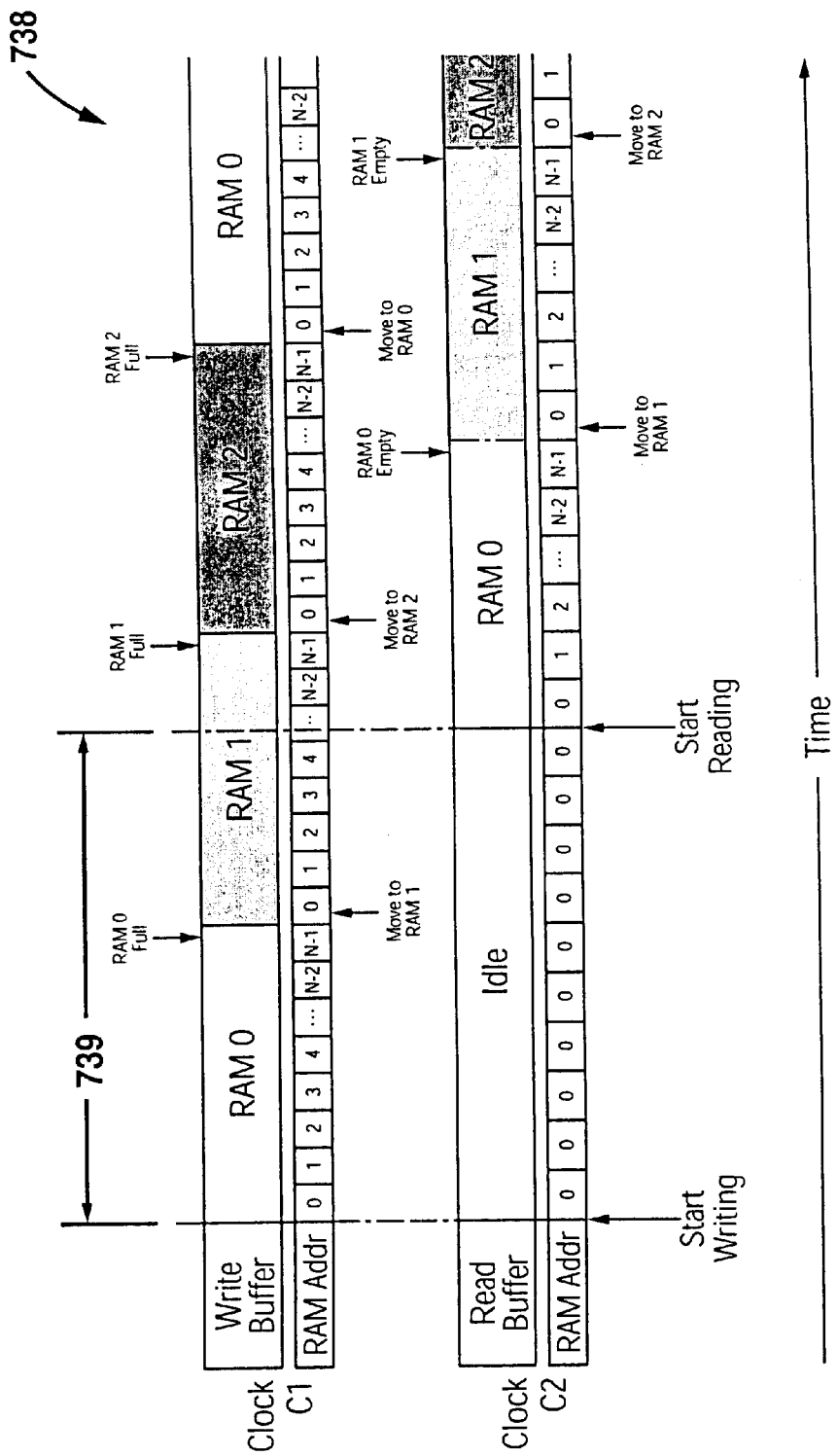
FIG. 36 is a diagram of a 3-buffer synchronizer sequence illustrating the sequencing and relative relationships of read and write operations to three RAM buffers in accordance with one embodiment of the present invention.

FIG. 36 is a diagram of a 3-buffer synchronizer sequence 738 illustrating the sequencing and relative relationships of read and write operations to three RAM buffers. Potential clock synchronization delay issues pertaining to real-time buffer sequencing for the continuous data output stream are mitigated by the fact that read and write operations are separated from each other by a skew 739 of approximately 1½ RAM buffers.

The skew 739 provides a buffer region of about one half of a RAM buffer separating potential collisions between read and write operations occurring in the same RAM buffer at the same time. This buffer region is there to absorb inaccuracies in the "start writing" and "start reading" commands, variations in data lull periods in the input data stream, and deviations in timing due to synchronization delays and/or offsets between the two clock domains.

Figure 37:
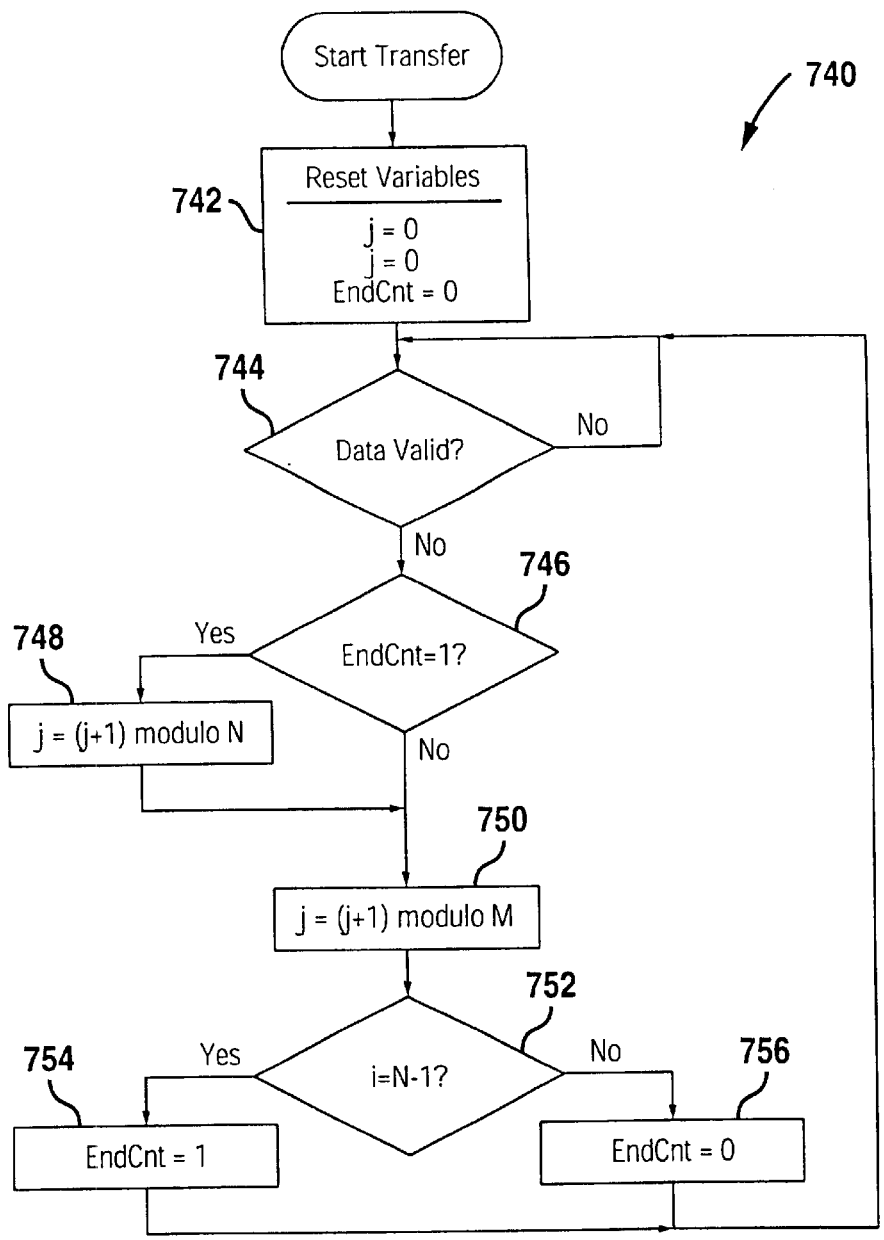
FIG. 37 is a flow chart of a method for sequencing through RAM addresses and modules in accordance with one embodiment of the present invention.

FIG. 37 is a flow chart of a method 740 for sequencing through RAM addresses and modules in accordance with one embodiment of the present invention. The method 740 begins at an operation 742 in which the RAM address for both read and write operations is set to zero, as is the selected RAM buffer. Next, an operation 744 asks if the data is valid. If the answer is no, operation 744 repeats itself until data is valid. If the answer is yes, then the method 740 proceeds to an operation 746 which asks if a variable called EndCnt is equal to 1. If the answer is yes, then the last RAM module has been reached and an operation 748 increments to select the next RAM module before executing an operation 750. If the answer is no from operation 746, then operation 750 increments the RAM address.

Next the method 740 proceeds to an operation 752 that determines whether the last RAM address has been reached. If it has, then EndCnt is set equal to 1 in an operation 754. If the last RAM address has not been reached, then EndCnt is set equal to 0 in an operation 756. From both operations 754 and 756, the method 740 loops back to operation 744 where the whole process starts again. Note that while read and write operations follow the same basic sequence, they are skewed in time by approximately one and one half RAM buffers, as noted previously.

Figure 38:
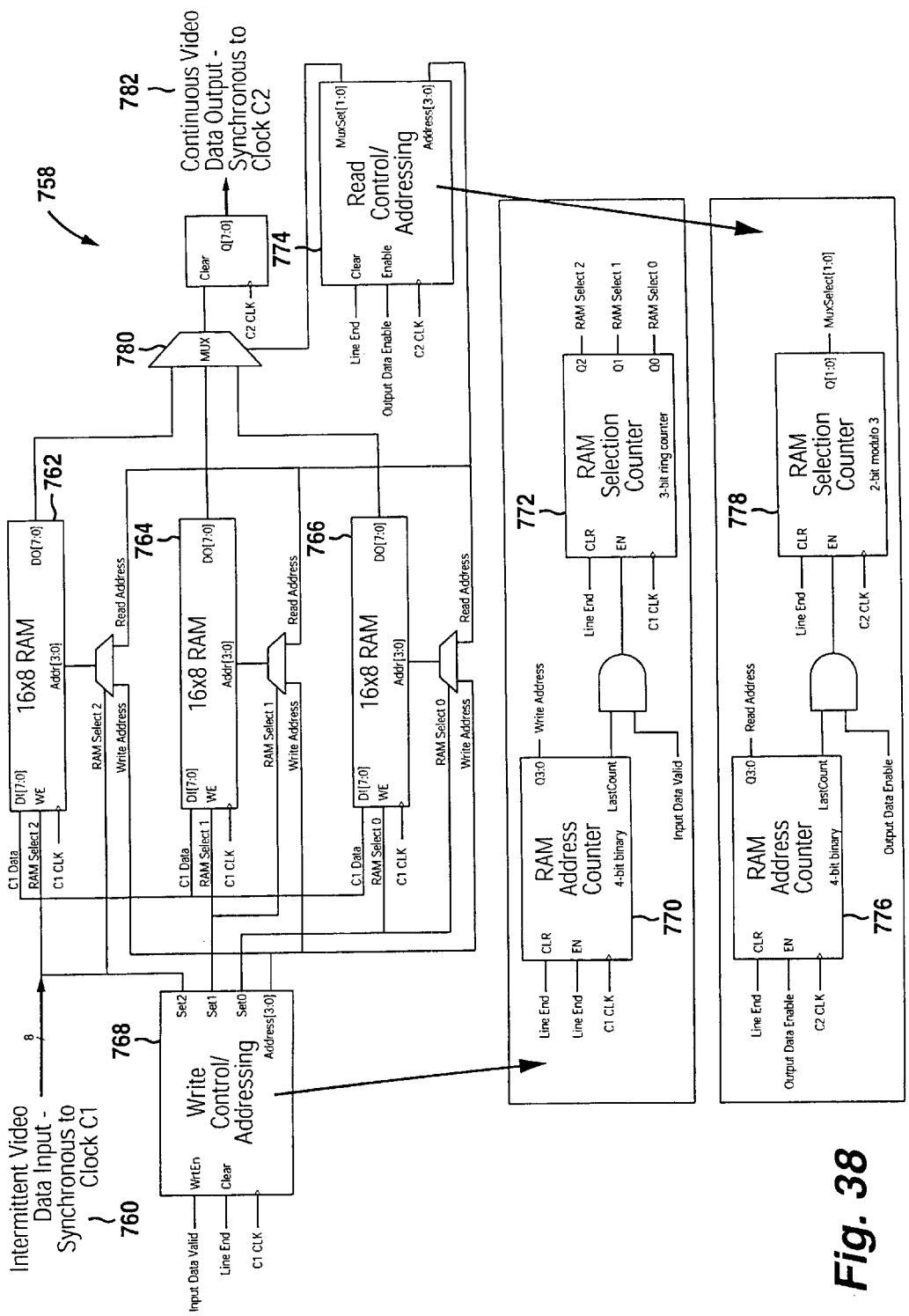
FIG. 38 is a diagram of a synchronizer of the present invention configured for use in a video scaling application in accordance with one embodiment of the present invention.

FIG. 38 is a diagram of a synchronizer 758 in accordance with one embodiment of the present invention intended for use in a video scaling application. The input source generates an 8-bit wide input data stream 760 for the synchronizer 758. The input data stream 760 runs at a clock rate of 732 MHz (C1) with an average data rate of 48 MHz (C2). Three 8-bit wide by 16-element deep RAM buffers 762, 764, and 766 are used. A to WCL unit 768 generates three RAM write-enable signals and a 4-bit RAM address.

A video scaler produces a "data valid" signal indicating when valid pixel data is available on the input data port. Whenever data is valid at this port, it will be written into the RAM buffers 762, 764, and 766. The WCL unit 768 performs this write operation as described above. The WCL unit 768 is composed of a first counter 770 counting from 0 to 15 and producing the RAM address, and a second counter 772 (a ring counter) counting from 0 to 2 and producing the RAM select/write-enable lines.

At approximately the point at which one and one half RAM buffers have been filled, an external signal is received which indicates that data output should begin. A RCL unit 774 then begins generating a series of addresses to the RAM buffers 762, 764, and 766 to extract the data previously written under control of the WCL unit 768. The RCL unit 774 is also composed of a third counter 776 counting from 0 to 15 and producing the RAM address, and a fourth counter 778 counting from 0 to 2 and producing the data output through a MUX 780.

The MUX 780 produces an output data stream 782 that must be continuous since it provides the real-time data stream for a raster-scanned display. Each scan line of video data is 1280 8-bit data elements long, and a continuous data stream of this length must be produced for each output scan line. Logic in the synchronizer circuit recognizes the end of a horizontal scan line and resets the WCL unit 768 and RCL unit 774 at the end of a line in preparation for the next line of video data.

While this invention has been described in terms of several preferred embodiments, it will be appreciated that those skilled in the art upon reading the preceding specifications and studying the drawings will realize various alterations, additions, permutations and equivalents thereof. It is therefore intended that the present invention includes all such alterations, additions, permutations, and equivalents as fall within the true spirit and scope of the invention.

What is claimed is:

1. A digital image enhancer comprising:
    a video processor receptive to an interlaced video stream and providing a deinterlaced video stream comprising:
        a first deinterlacer operative to analyze progressive frames of said interlaced video stream in an attempt to determine an original source type and sequencing used for the interlaced video stream and further operative to convert said interlaced video stream into a deinterlaced video stream using a conversion process that is dependent upon said detection of said original source type and sequencing; and
        a second deinterlacer operative to reduce motion artifacts detected by a frequency analysis of said interlaced video stream; and
    an output processor receptive to said deinterlaced video stream and operative to provide a scaled, deinterlaced video stream.

2. A digital image enhancer as recited in claim 1 wherein said second deinterlacer is operative to detect diagonal features and to smooth said detected diagonal features.

3. A digital image enhancer as recited in claim 1 wherein said video processor processes said deinterlaced video stream in vertical slices.

4. A digital image enhancer as recited in claim 1 wherein said output processor is operative to scale said deinterlaced video stream to modify a video display output format of a video output stream.

5. A digital image enhancer as recited in claim 1 wherein said output processor includes a data rate synchronizer between a first data rate of said deinterlaced video stream and a second data rate of a video output stream.

6. A digital image enhancer comprising:
    a deinterlacing processor receptive to an interlaced video stream and operative to provide a deinterlaced video stream; and
    a video output processor receptive to the output of said deinterlacing processor, wherein said deinterlacing processor processes said interlaced video stream in vertical slices to provide a scaled, deinterlaced video stream.

7. A digital image enhancer comprising:
    a deinterlacing processor receptive to an interlaced video stream and operative to provide a deinterlaced video stream and is operative to analyze progressive frames of said interlaced video stream in an attempt to determine an original source type and sequencing used for the interlaced video stream; and
    a video output processor receptive to the output of said deinterlacing processor, wherein said deinterlacing processor processes said interlaced video stream in vertical slices to provide a scaled, deinterlaced video stream.

8. A digital image enhancer as recited in claim 7 wherein said deinterlacing processor is further operative to convert said interlaced video stream into a deinterlaced video stream using a conversion process that is dependent upon said detection of said original source type and sequencing.

9. A digital image enhancer as recited in claim 7 wherein said deinterlacing processor is operative to reduce motion artifacts detected by a frequency analysis of said interlaced video stream.

10. A digital image enhancer as recited in claim 7 wherein said deinterlacing processor is operative to detect diagonal features and to smooth said detected diagonal features.

11. A digital image enhancer as recited in claim 7 wherein said video output processor is operative to scale said deinterlaced video stream to modify a video display output format of a video output stream.

12. A digital image enhancer as recited in claim 7 wherein said video output processor includes a data rate synchronizer between a first data rate of said deinterlaced video stream and a second data rate of a video output stream.

13. A method for processing digital video comprising:
    deinterlacing an interlaced video stream with a video processor by at least one of a number of deinterlacing methods to produce a deinterlaced video stream, said video processor having a first deinterlacer and a second deinterlacer, said deinterlacing methods include at least one of an original source detection method, a diagonal feature detection method, and a motion artifact detection method; and
    scaling said deinterlaced video stream.

14. A method for processing digital video as recited in claim 13 wherein said deinterlacing methods include processing said interlaced video stream in vertical slices.

15. A method for processing digital video as recited in claim 13 wherein said scaling includes a horizontal scaling of the deinterlaced video stream.

16. A method for processing digital video as recited in claim 13 wherein said scaling includes a data rate synchronizer between a first data rate of said deinterlaced video stream and a second data rate of a video output stream.

* * * * *